US009782698B2

(12) United States Patent
Lewis et al.

(10) Patent No.: US 9,782,698 B2
(45) Date of Patent: *Oct. 10, 2017

(54) LIQUID REFINEMENT

(71) Applicant: Recovered Energy, Inc., Pocatello, ID (US)

(72) Inventors: Richard Lewis, Pocatello, ID (US); Kurt Scott, Blackfoot, ID (US)

(73) Assignee: RECOVERED ENERGY, INC., Pocatello, ID (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/055,480

(22) Filed: Feb. 26, 2016

(65) Prior Publication Data
US 2016/0250567 A1 Sep. 1, 2016

Related U.S. Application Data

(60) Provisional application No. 62/121,660, filed on Feb. 27, 2015, provisional application No. 62/121,673, (Continued)

(51) Int. Cl.
*B01D 21/02* (2006.01)
*B01D 17/028* (2006.01)
(Continued)

(52) U.S. Cl.
CPC ...... *B01D 21/0087* (2013.01); *B01D 17/0211* (2013.01); *B01D 21/003* (2013.01);
(Continued)

(58) Field of Classification Search
CPC ............ B01D 17/0211; B01D 17/0214; B01D 21/0009; B01D 21/003; B01D 21/0042; B01D 21/0045; B01D 21/0087
(Continued)

(56) References Cited

U.S. PATENT DOCUMENTS 3,311,296 A 3/1967 Torobin
3,666,112 A 5/1972 Pielkenrood et al.
(Continued)

FOREIGN PATENT DOCUMENTS

EP 2143473 1/2010
FR 1081214 12/1954
(Continued)

OTHER PUBLICATIONS

Hydroscreen Static Screen: Liquid and solid separation, brochure by Parkson, pp. 1-2.
(Continued)

*Primary Examiner* — Christopher Upton
(74) *Attorney, Agent, or Firm* — Kunzler Law Group, PC

(57) ABSTRACT

An apparatus for refining a liquid stream using 180 degree redirection and inclined plates. The apparatus includes a first flow chamber, a second flow chamber, and a separation chamber. The first flow chamber directs the liquid stream downwards in a first direction at a first velocity, the second flow chamber directs the liquid carrier upwards in a second direction opposite the first direction, and the separation chamber is disposed between the first flow chamber and the second flow chamber. The separation chamber includes a redirection portion that has inclined plates across which the liquid carrier flows and, as the liquid slows from a first velocity to a second velocity, the solid particles fall out of the liquid carrier and collect in the collection portion of the separation chamber.

20 Claims, 17 Drawing Sheets

Related U.S. Application Data filed on Feb. 27, 2015, provisional application No. 62/204,327, filed on Aug. 12, 2015.

(51) Int. Cl.
 *B01D 21/00* (2006.01)
 *B01D 17/02* (2006.01)
 *B01D 21/24* (2006.01)

(52) U.S. Cl.
 CPC ..... *B01D 21/0003* (2013.01); *B01D 21/0009* (2013.01); *B01D 21/0042* (2013.01); *B01D 21/0045* (2013.01); *B01D 21/0054* (2013.01); *B01D 21/10* (2013.01); *B01D 21/2405* (2013.01)

(58) Field of Classification Search
 USPC ............. 210/801, 802, 521, 532.1, 540
 See application file for complete search history.

(56) References Cited

U.S. PATENT DOCUMENTS

| | | | |
|---|---|---|---|
| 3,791,105 A | 2/1974 | Rhodes | |
| 3,915,858 A | 10/1975 | Condolios | |
| 4,263,137 A | 4/1981 | Kos | |
| 4,469,582 A | 9/1984 | Sublette et al. | |
| 4,559,141 A | 12/1985 | Gyulavari | |
| 4,889,624 A | 12/1989 | Soriente et al. | |
| 5,549,827 A | 8/1996 | Batson | |
| 5,720,705 A | 2/1998 | Inge et al. | |
| 8,603,343 B2 * | 12/2013 | Viguie | B01D 21/0042 210/521 |
| 8,945,401 B2 | 2/2015 | Cook et al. | |
| 2001/0042725 A1 * | 11/2001 | Goodrich | B01D 17/0211 210/801 |
| 2002/0000408 A1 * | 1/2002 | Koreis | B01D 21/0042 210/800 |
| 2004/0025961 A1 | 2/2004 | Beaulieu | |
| 2006/0054551 A1 * | 3/2006 | Myers | B01D 17/045 210/532.1 |
| 2010/0236409 A1 * | 9/2010 | Cnossen | B01D 21/0045 210/521 |
| 2011/0168641 A1 | 7/2011 | Boyd et al. | |
| 2011/0168643 A1 | 7/2011 | Streng et al. | |
| 2011/0186513 A1 | 8/2011 | Vuong et al. | |
| 2014/0374364 A1 * | 12/2014 | Spiess | B01D 21/0042 210/801 |
| 2016/0250568 A1 | 9/2016 | Lewis et al. | |
| 2016/0250569 A1 | 9/2016 | Lewis et al. | |

FOREIGN PATENT DOCUMENTS

| | | |
|---|---|---|
| FR | 2711072 | 4/1995 |
| GB | 897255 | 5/1962 |
| GB | 1352083 | 5/1974 |
| WO | 9010597 | 9/1990 |

OTHER PUBLICATIONS

Slant Rib Coalescing Oil/Water Separator: For minimum space and maximum separation efficiency, brochure by Parkson, pp. 1-2.
International Search Report and Written Opinion for International Application No. PCT/US2016/019958 dated Jun. 24, 2016.

\* cited by examiner

LIQUID REFINEMENT

CROSS-REFERENCE TO RELATED APPLICATIONS

This application claims the benefit of U.S. Provisional Patent Application Nos. 62/121,660 and 62/121,673, filed Feb. 27, 2015, and U.S. Provisional Patent Application No. 62/204,327, filed on Aug. 12, 2015, which are all incorporated herein by reference.

FIELD

The present disclosure relates to liquid refinement, and more particularly relates to removing solids and liquids from a liquid stream.

BACKGROUND

Liquid refinement is an important process for many different industries. For example, waste water treatment facilities, oil drilling operations, oil well produced water processes, fossil fuel refineries, power stations, food processing plants, mining operations, petrochemical plants, and agricultural operations, among others, all utilize mechanisms or systems for separating liquids from other components (e.g., contaminants, pollutants, solid particles, other liquids, etc.). Most conventional separators utilize active features (e.g., powered elements, agitators, vibrating screens, etc.), chemical reactions, filters, and/or gravity to accomplish the desired separation. The separation technologies that employ active features, filter media and/or chemical reactions can be expensive and complicated to operate and maintain. Conventional technologies that rely exclusively on gravity are either too inefficient or are unable to achieve the requisite level of separation.

SUMMARY

From the foregoing discussion, it should be apparent that a need exists for an apparatus, system, and method for refining a liquid stream that overcome the limitations of conventional liquid separators. Beneficially, such an apparatus, system, and method would provide a faster, more complete, and higher level of separation than conventional gravity separators, thus improving the ease, efficiency, and effectiveness of removing components from a liquid stream.

The subject matter of the present application has been developed in response to the present state of the art, and in particular, in response to the problems and needs in the art that have not yet been fully solved by currently available liquid separators. For example, the ease, efficiency, and effectiveness of refining a liquid stream could be improved by flowing the liquid stream across inclined plates while slowing and redirecting the liquid stream. Accordingly, the present disclosure has been developed to provide apparatuses, systems, and methods for refining a liquid stream that overcome many or all of the above-discussed shortcomings in the art.

Disclosed herein, according to one embodiment, is an apparatus for refining a liquid stream. The liquid stream includes a liquid carrier that has solid particles mixed therein. The solid particles have a specific gravity that is greater than a specific gravity of the liquid carrier. The apparatus includes a first flow chamber, a second flow chamber, and a separation chamber. The first flow chamber directs the liquid stream downwards in a first direction at a first velocity. The first direction is substantially parallel to gravity and the first velocity is greater than a settling velocity of the solid particles in the liquid carrier. The second flow chamber directs the liquid carrier upwards in a second direction opposite the first direction at a second velocity less than the settling velocity. The separation chamber is disposed between the first flow chamber and the second flow chamber and includes a redirection portion and a collection portion. The redirection portion includes inclined plates across which the liquid carrier flows and the redirection portion redirects flow in the first direction from the first flow chamber to a third direction substantially perpendicular to the first direction and redirects flow in the third direction into the second flow chamber. The liquid slows from the first velocity to the second velocity and the solid particles fall out of the liquid carrier in the redirection portion and collect in the collection portion of the separation chamber.

According to one implementation, the inclined plates define inclined channels fluidly coupling an outlet of the first flow chamber and an inlet of the second flow chamber. In such an implementation, the liquid carrier flows into the inclined channels in the third direction. In another implementation, the second flow chamber is an annulus formed around the first flow chamber and the third direction is radially outward. The inclined plates in the redirection portion of the separation chamber can be circumferentially spaced apart in an annular formation and the annular formation of inclined plates can be positioned proximate an inlet of, and substantially concentric with the annulus that is, the second flow chamber.

In one implementation, a slope of the inclined plates is between about 20 degrees and about 65 degrees. For example, the slope of the inclined plates may be about 55 degrees. In another implementation, the cross-sectional area of the second flow chamber is between about 1.5 and about 3 times the cross-sectional area of the first flow chamber. In one implementation, the liquid stream is free of flocculants. The first flow chamber, the second flow chamber, and the separation chamber may be free of moving parts. Further, the first flow chamber, the second flow chamber, and the separation chamber may be free of interchangeable media.

In one implementation, the liquid carrier also has a lower-density liquid mixed therein that has a specific gravity that is less than the specific gravity of the liquid carrier. In such an implementation, the apparatus further includes a third flow chamber for directing the liquid carrier, substantially free of solid particles, downwards in the first direction and a top separation chamber disposed between the second flow chamber and the third flow chamber. The top separation chamber has a top redirection portion and a top collection portion. The top redirection portion redirects flow in the second direction from the second flow chamber at a third velocity to the first direction in the third flow chamber at a fourth velocity, with the third velocity being greater than a rise-velocity of the lower-density liquid in the liquid carrier and the fourth velocity being less than the rise-velocity. The lower-density liquid rises out of the liquid carrier in the top redirection portion of the top separation chamber and collects in the top collection portion of the top separation chamber.

According to one implementation, the top redirection portion of the top separation chamber includes top inclined plates across which the liquid carrier flows. The top redirection portion may redirect flow in the second direction from the second flow chamber to a fourth direction substantially perpendicular to the first and second directions and may redirect flow in the fourth direction into the third flow chamber. In such an implementation, flow of the liquid carrier through the top redirection portion of the top separation chamber slows from the third velocity to the fourth velocity. In such an implementation, the top inclined plates may define top inclined channels fluidly coupling an outlet of the second flow chamber and an inlet of the third flow chamber and the liquid carrier can flow out of the top inclined channels in the fourth direction.

In one implementation, the second flow chamber is an annulus formed around the third flow chamber, the third direction is radially outward, and the fourth direction is radially inward. In another implementation, the top inclined plates in the top redirection portion of the top separation chamber are circumferentially spaced apart in an annular formation and the annular formation of the top inclined plates is positioned proximate an outlet of, and substantially concentric with the annulus that is, the second flow chamber. The second flow chamber may also include coalescing media.

Also disclosed herein is a method for refining a liquid stream. The liquid stream includes a liquid carrier that has solid particles mixed therein. The solid particles have a specific gravity that is greater than a specific gravity of the liquid carrier. The method includes flowing the liquid stream through a first flow chamber in a first direction at a first velocity, with the first direction being substantially parallel to gravity and the first velocity being greater than a settling velocity of the solid particles in the liquid carrier. The method further includes redirecting the liquid carrier 180 degrees such that the liquid carrier flows into a second flow chamber in a second direction opposite the first direction at a second velocity less than the settling velocity. During redirecting the liquid carrier, the liquid carrier flows into inclined channels in a third direction substantially perpendicular to the first and second directions. Also, the inclined channels are defined by inclined plates and fluidly couple an outlet of the first flow chamber and an inlet of the second flow chamber and solid particles are collected as the solid particles fall out of the liquid carrier during redirecting the liquid carrier.

In one implementation, the method further includes electrostatically charging the inclined plates. In another implementation, the first velocity is about twice the second velocity.

Disclosed herein is another embodiment of an apparatus for refining a liquid stream that has a liquid carrier with solid particles mixed therein. The solid particles have a specific gravity that is greater than a specific gravity of the liquid carrier. The apparatus includes a first flow chamber for directing the liquid stream downwards in a first direction at a first velocity. The first direction is substantially parallel to gravity and the first velocity is greater than a settling velocity of the solid particles in the liquid carrier. The apparatus also includes a second flow chamber for directing the liquid carrier upwards in a second direction opposite the first direction at a second velocity less than the settling velocity. The second flow chamber is an annulus formed around the first flow chamber. The apparatus also includes a separation chamber disposed between the first flow chamber and the second flow chamber, the separation chamber having a redirection portion and a collection portion. The redirection portion of the separation chamber has inclined plates that define inclined channels through which the liquid carrier flows. The inclined channels fluidly couple an outlet of the first flow chamber and an inlet of the second flow chamber. The inclined plates are circumferentially spaced apart in an annular formation and the annular formation of inclined plates is positioned proximate an inlet of, and substantially concentric with the annulus that is, the second flow chamber. The redirection portion of the separation chamber redirects flow in the first direction from the first flow chamber to a radially outward direction substantially perpendicular to the first direction and redirects flow in the radially outward direction into the second flow chamber. The liquid carrier flows into the inclined channels in the radially outward direction and flow of the liquid carrier through the redirection portion of the separation chamber slows from the first velocity to the second velocity. Further, the solid particles fall out of the liquid carrier in the redirection portion and collect in the collection portion of the separation chamber.

Also disclosed herein, according to one embodiment, is an apparatus for refining a liquid stream that includes a liquid carrier with a lower-density liquid mixed therein. The lower-density liquid has a specific gravity that is less than a specific gravity of the liquid carrier. The apparatus includes a first flow chamber for directing the liquid stream upwards in a first direction at a first velocity. The first direction is opposite gravity and the first velocity is greater than a rise-velocity of the lower-density liquid in the liquid carrier. The apparatus also includes a second flow chamber for directing the liquid carrier downwards in a second direction opposite the first direction at a second velocity less than the rise-velocity and a separation chamber disposed between the first flow chamber and the second flow chamber. The separation chamber includes a redirection portion and a collection portion. The redirection portion of the separation chamber has inclined plates across which the liquid carrier flows and the redirection portion redirects flow in the first direction from the first flow chamber to a third direction substantially perpendicular to the first direction and redirects flow in the third direction into the second flow chamber. Further, flow of the liquid carrier through the redirection portion of the separation chamber slows from the first velocity to the second velocity and the lower-density liquid rises out of the liquid carrier in the redirection portion and collects in the collection portion of the separation chamber.

In one implementation, the inclined plates define inclined channels fluidly coupling an outlet of the first flow chamber and an inlet of the second flow chamber and the liquid carrier flows into the inclined channels in the third direction. In another implementation, the second flow chamber is an annulus formed around the first flow chamber and the third direction is radially outward. In such an implementation, the inclined plates in the redirection portion of the separation chamber are circumferentially spaced apart in an annular formation that is positioned proximate an inlet of, and substantially concentric with the annulus that is, the second flow chamber.

According to one implementation, a slope of the inclined plates, relative to horizontal, is between about 20 degrees and about 65 degrees. For example, the slope of the inclined plates, relative to horizontal, may be about 55 degrees. In one implementation, a leading edge of each of the inclined plates is bent. In another implementation, the cross-sectional area of the second flow chamber is between about 1.5 and about 3 times the cross-sectional area of the first flow chamber. In yet another implementation, the first flow chamber, the second flow chamber, and the separation chamber are free of moving parts. The first flow chamber may include a coalescing media.

In one implementation, the liquid carrier also has solid particles mixed therein. The solid particles have a specific gravity that is greater than the specific gravity of the liquid carrier. In such an implementation, the apparatus further includes a third flow chamber for directing the liquid carrier downwards in the second direction and a bottom separation chamber disposed between the third flow chamber and the first flow chamber. The bottom separation chamber includes a bottom redirection portion and a bottom collection portion. The bottom redirection portion of the bottom separation chamber redirects flow in the second direction from the third flow chamber at a third velocity to the first direction in the first flow chamber at a fourth velocity. The third velocity is greater than the settling velocity of the solid particles in the liquid carrier and the fourth velocity is less than the settling velocity. Further, the solid particles fall out of the liquid carrier in the bottom redirection portion of the bottom separation chamber and collect in the bottom collection portion of the bottom separation chamber.

In one implementation, the bottom redirection portion of the bottom separation chamber has bottom inclined plates across which the liquid carrier flows. The bottom redirection portion of the bottom separation chamber redirects flow in the second direction from the third flow chamber to a fourth direction substantially perpendicular to the first and second directions and redirects flow in the fourth direction into the first flow chamber. Flow of the liquid carrier through the bottom redirection portion of the bottom separation chamber slows from the third velocity to the fourth velocity.

According to another implementation, the bottom inclined plates define bottom inclined channels fluidly coupling an outlet of the third flow chamber and an inlet of the first flow chamber. The liquid carrier may flow into the bottom inclined channels in the fourth direction and the fourth direction may be substantially opposite the third direction. In one implementation, the first flow chamber is an annulus formed around the second flow chamber. In such an implementation, the bottom inclined plates in the bottom redirection portion of the bottom separation chamber are circumferentially spaced apart in an annular formation that is positioned proximate an inlet of, and substantially concentric with the annulus that is, the first flow chamber.

Further disclosed herein, according to one embodiment, is a method for refining a liquid stream that has a liquid carrier having a lower-density liquid mixed therein. The lower-density liquid has a specific gravity that is less than a specific gravity of the liquid carrier. The method includes flowing the liquid stream through a first flow chamber in a first direction at a first velocity, the first direction being substantially opposite gravity and the first velocity being greater than a rise-velocity of the lower-density liquid in the liquid carrier. The method also includes redirecting the liquid carrier 180 degrees such that the liquid carrier flows into a second flow chamber in a second direction opposite the first direction at a second velocity less than the rise-velocity. During redirecting the liquid carrier, the liquid carrier flows out of inclined channels in a third direction substantially perpendicular to the first and second directions. The inclined channels are defined by inclined plates and fluidly couple an outlet of the first flow chamber and an inlet of the second flow chamber and the lower-density liquid is collected as the lower-density liquid rises out of the liquid carrier during redirecting the liquid carrier.

In one implementation, the method further includes electrostatically charging the inclined plates. In another implementation, the first velocity is about twice the second velocity.

Disclosed herein, according to one embodiment, is an apparatus for refining a liquid stream that includes liquid carrier having a lower-density liquid mixed therein. The lower-density liquid has a specific gravity that is less than a specific gravity of the liquid carrier. The apparatus includes a first flow chamber for directing the liquid stream upwards in a first direction at a first velocity. The first direction is opposite gravity and the first velocity is greater than a rise-velocity of the lower-density liquid in the liquid carrier. The apparatus also includes a second flow chamber for directing the liquid carrier downwards in a second direction opposite the first direction at a second velocity less than the rise-velocity and a separation chamber disposed between the first flow chamber and the second flow chamber. The separation chamber has a redirection portion and a collection portion and the second flow chamber is an annulus formed around the first flow chamber. The separation chamber has inclined plates that define inclined channels through which the liquid carrier flows. The inclined channels fluidly couple an outlet of the first flow chamber and an inlet of the second flow chamber and the inclined plates are circumferentially spaced apart in an annular formation that is positioned proximate an inlet of, and substantially concentric with the annulus that is, the second flow chamber. The redirection portion of the separation chamber redirects flow in the first direction from the first flow chamber to a radially outward direction substantially perpendicular to the first direction and redirects flow in the radially outward direction into the second flow chamber. The liquid carrier flows into the inclined channels in the radially outward direction and flow of the liquid carrier through the redirection portion of the separation chamber slows from the first velocity to the second velocity. Also, the lower-density liquid rises out of the liquid carrier in the redirection portion and collects in the collection portion of the separation chamber.

Also disclosed herein, according to one embodiment, is an apparatus for refining a liquid stream that has a liquid carrier having solid particles and a lower-density liquid mixed therein. The solid particles have a specific gravity that is greater than a specific gravity of the liquid carrier and the lower-density liquid has a specific gravity that is less than the specific gravity of the liquid carrier. The apparatus includes a first flow chamber for directing the liquid stream downwards in a first direction at a first velocity. The first direction is substantially parallel to gravity and the first velocity is greater than a settling velocity of the solid particles in the liquid carrier. The apparatus also includes a second flow chamber for directing the liquid carrier upwards in a second direction opposite the first direction and a bottom separation chamber disposed between the first flow chamber and the second flow chamber. The bottom separation chamber has a bottom redirection portion and a bottom collection portion. The bottom redirection portion of the bottom separation chamber has bottom inclined plates across which the liquid carrier flows. The bottom redirection portion of the bottom separation chamber redirects flow in the first direction from the first flow chamber at a first velocity to a third direction, substantially perpendicular to the first direction, and redirects flow in the third direction into the second flow chamber at a second velocity. Flow of the liquid carrier through the bottom redirection portion of the bottom separation chamber slows from the first velocity to the second velocity, which is less than the settling velocity of the solid particles in the liquid carrier. The solid particles fall out of the liquid carrier in the bottom redirection portion of the bottom separation chamber and collect in the bottom collection portion of the bottom separation chamber. The apparatus also includes a third flow chamber for directing the liquid carrier, substantially free of solid particles, downwards in the first direction. The apparatus further includes a top separation chamber disposed between the second flow chamber and the third flow chamber, the top separation chamber having a top redirection portion and a top collection portion. The top redirection portion of the top separation chamber redirects flow in the second direction from the second flow chamber at a third velocity to the first direction in the third flow chamber at a fourth velocity. The third velocity is greater than a rise-velocity of the lower-density liquid in the liquid carrier and the fourth velocity is less than the rise-velocity. The lower-density liquid rises out of the liquid carrier in the top redirection portion of the top separation chamber and collects in the top collection portion of the top separation chamber.

In one implementation, the bottom inclined plates define bottom inclined channels fluidly coupling an outlet of the first flow chamber and an inlet of the second flow chamber. In such an implementation, the liquid carrier flows into the bottom inclined channels in the third direction. In another implementation, the second flow chamber is an annulus formed around the third flow chamber and the third direction is radially outward. In yet another implementation, the bottom inclined plates in the bottom redirection portion of the bottom separation chamber are circumferentially spaced apart in an annular formation that is positioned proximate an inlet of, and substantially concentric with the annulus that is, the second flow chamber.

In one implementation the top redirection portion of the top separation chamber has top inclined plates across which the liquid carrier flows. The top redirection portion of the top separation chamber redirects flow in the second direction from the second flow chamber to a fourth direction substantially perpendicular to the first and second directions and redirects flow in the fourth direction into the third flow chamber. In such an implementation, the top inclined plates may define top inclined channels that fluidly couple an outlet of the second flow chamber and an inlet of the third flow chamber. The liquid carrier may flow out of the top inclined channels in the fourth direction. The second flow chamber may be an annulus formed around the third flow chamber and the fourth direction may be radially inward.

In one implementation, the top inclined plates in the top redirection portion of the top separation chamber are circumferentially spaced apart in an annular formation that is positioned proximate an inlet of, and substantially concentric with the annulus that is, the second flow chamber. In one implementation, the fourth direction is substantially is opposite the third direction. The second flow chamber may include coalescing media. In one implementation, a cross-sectional dimension of an inlet portion of the second flow chamber is greater than a cross-sectional dimension of an outlet of the second flow chamber. In another implementation, the third velocity is greater than the second velocity. In yet another implementation, the magnitude of the third velocity is substantially the same as the magnitude of the first velocity.

In one implementation, an inlet of the first flow chamber is a bent pipe that directs the liquid stream towards a bottom side of a separator plate disposed between the first flow chamber and the third flow chamber. In another implementation, a slope of the bottom inclined plates, relative to horizontal, is between about 20 degrees and about 65 degrees. In another implementation, the liquid stream is free of flocculants. In yet another implementation, the first flow chamber, the second flow chamber, the third flow chamber, the bottom separation chamber, and the top separation chamber are free of moving parts.

Disclosed herein, according to one embodiment, is a method for refining a liquid stream that has a liquid carrier with solid particles and a lower-density liquid mixed therein. The solid particles have a specific gravity that is greater than a specific gravity of the liquid carrier and the lower-density liquid has a specific gravity that is less than the specific gravity of the liquid carrier. The method includes flowing the liquid stream through a first flow chamber in a first direction at a first velocity. The first direction is substantially parallel to gravity and the first velocity is greater than a settling velocity of the solid particles in the liquid carrier. The method also includes redirecting the liquid carrier 180 degrees such that the liquid carrier flows from the first flow chamber into a second flow chamber in a second direction opposite the first direction at a second velocity less than the settling velocity. During redirecting the liquid carrier, the liquid carrier flows into inclined channels, which are defined by inclined plates, in a third direction substantially perpendicular to the first and second directions. The inclined channels fluidly couple an outlet of the first flow chamber and an inlet of the second flow chamber. The method further includes collecting the solid particles as the solid particles fall out of the liquid carrier during redirecting the liquid carrier from the first flow chamber to the second flow chamber. Still further, the method includes flowing the liquid stream through the second flow chamber in the second direction, redirecting the liquid carrier 180 degrees such that the liquid carrier flows from the second flow chamber at a third velocity to a third flow chamber in the first direction at a fourth velocity. The third velocity is greater than a rise-velocity of the lower-density liquid in the liquid carrier and the fourth velocity is less than the rise-velocity. The method also includes collecting the lower-density liquid as the lower-density liquid rises out of the liquid carrier during redirecting the liquid carrier from the second flow chamber to the third flow chamber.

In one implementation, during redirecting the liquid carrier from the second flow chamber to the third flow chamber, the liquid carrier flows out of top inclined channels in a fourth direction substantially perpendicular to the first and second directions. In such an implementation, the top inclined channels are defined by top inclined plates and fluidly couple an outlet of the second flow chamber and an inlet of the third flow chamber.

Also disclosed herein, according to yet another embodiment, is an apparatus for refining a liquid stream which has a liquid carrier with solid particles and a lower-density liquid mixed therein. The solid particles have a specific gravity that is greater than a specific gravity of the liquid carrier and the lower-density liquid has a specific gravity that is less than the specific gravity of the liquid carrier. The apparatus includes a first flow chamber for directing the liquid stream downwards in a first direction at a first velocity. The first direction is substantially parallel to gravity and the first velocity is greater than a settling velocity of the solid particles in the liquid carrier. The apparatus also includes a second flow chamber for directing the liquid carrier upwards in a second direction opposite the first direction and a bottom separation chamber disposed between the first flow chamber and the second flow chamber. The bottom separation chamber has a bottom redirection portion and a bottom collection portion. The bottom redirection portion of the bottom separation chamber has bottom inclined channels, defined by bottom inclined plates, which fluidly connect an outlet of the first flow chamber to an inlet of the second flow chamber. The liquid carrier flows through the bottom inclined channels. The bottom inclined plates in the bottom redirection portion of the bottom separation chamber are circumferentially spaced apart in an annular formation. The bottom redirection portion of the bottom separation chamber redirects flow in the first direction from the first flow chamber at a first velocity to a radially outward direction, substantially perpendicular to the first direction, and redirects flow in the radially outward direction into the second flow chamber at a second velocity. The liquid carrier flows into the bottom inclined channels in the radially outward direction and flow of the liquid carrier through the bottom redirection portion of the bottom separation chamber slows from the first velocity to the second velocity. Further, the second velocity is less than the settling velocity of the solid particles in the liquid carrier and the solid particles fall out of the liquid carrier in the bottom redirection portion of the bottom separation chamber and collect in the bottom collection portion of the bottom separation chamber. The apparatus further includes a third flow chamber for directing the liquid carrier, substantially free of solid particles, downwards in the first direction. The second flow chamber is an annulus formed around the third flow chamber. The apparatus also includes a top separation chamber disposed between the second flow chamber and the third flow chamber, with the top separation chamber having a top redirection portion and a top collection portion. The top redirection portion of the top separation chamber redirects flow in the second direction from the second flow chamber at a third velocity to the first direction in the third flow chamber at a fourth velocity. The third velocity is greater than a rise-velocity of the lower-density liquid in the liquid carrier and the fourth velocity is less than the rise-velocity. The lower-density liquid rises out of the liquid carrier in the top redirection portion of the top separation chamber and collects in the top collection portion of the top separation chamber. The top redirection portion of the top separation chamber includes top inclined plates across which the liquid carrier flows. The top inclined plates define top inclined channels fluidly coupling an outlet of the second flow chamber and an inlet of the third flow chamber. The top inclined plates in the top redirection portion of the top separation chamber are circumferentially spaced apart in an annular formation. The top redirection portion of the top separation chamber redirects flow in the second direction from the second flow chamber to a radially inward direction substantially perpendicular to the first and second directions and redirects flow in the radially inward direction into the third flow chamber. Further, the liquid carrier flows out of the top inclined channels in the radially inward direction.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the following description, numerous specific details are provided. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the disclosure.

Illustrated in FIGS. 1-18 are several representative embodiments of an apparatus for refining a liquid stream and several representative embodiments of methods and systems of using the apparatus. More specifically, FIGS. 1-8 relate to an apparatus for removing solid particles from a liquid stream, FIGS. 9-12 relate to an apparatus for removing a lower-density liquid from a liquid stream, and FIGS. 13-18 relate to an apparatus for removing both solid particles and a lower-density liquid from a liquid stream.

As described herein, the apparatus for refining a liquid stream provides various advantages and benefits over other liquid separators and liquid separation procedures. However, the recited advantages are not meant to be limiting in any way, as one skilled in the art will appreciate that other advantages may also be realized upon practicing the present disclosure.

Figure 1:
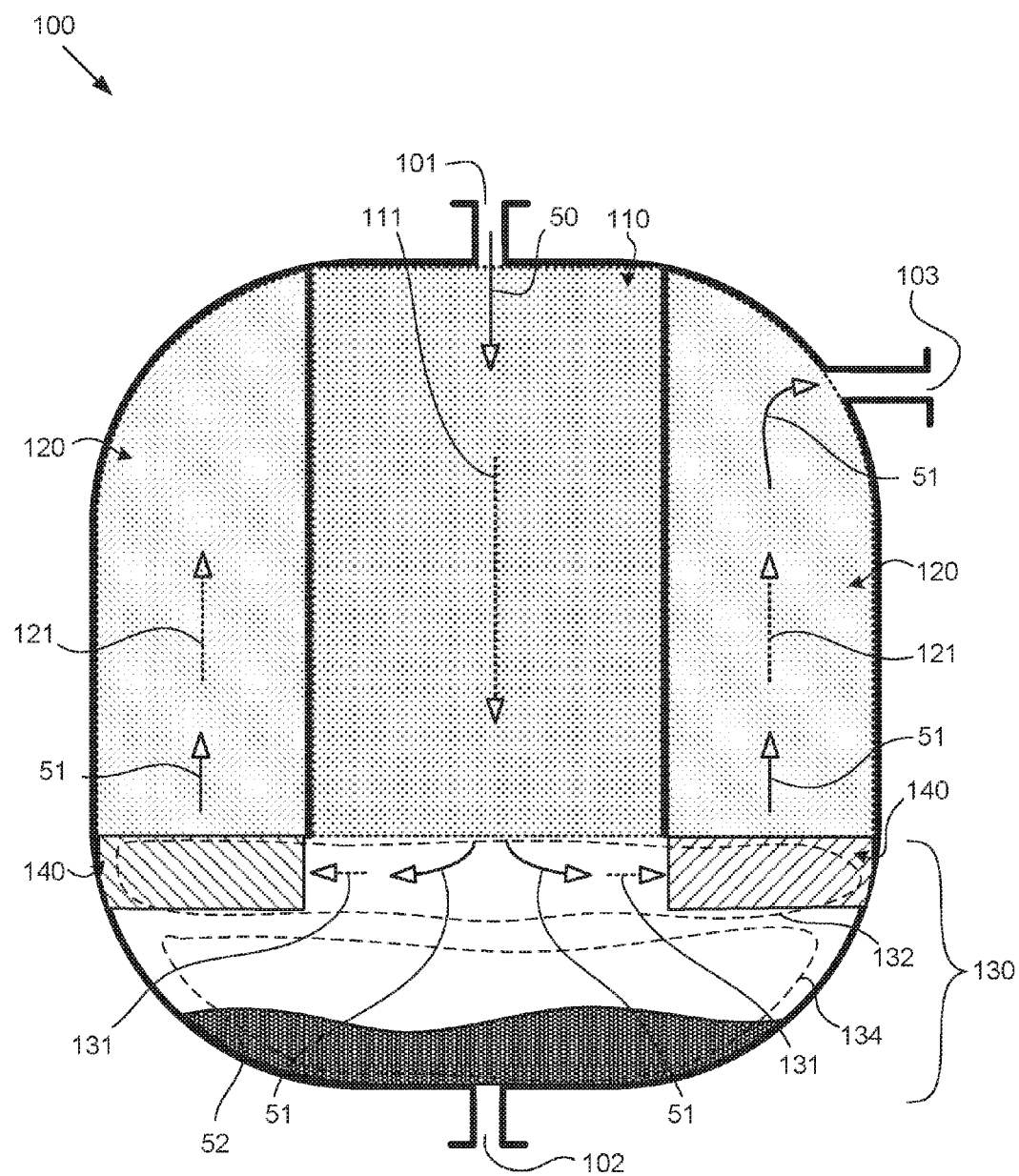
FIG. 1 is a schematic, cross-sectional view of an apparatus for removing solid particles from a liquid stream, according to one embodiment.

FIG. 1 is a schematic, cross-sectional view of an apparatus 100 for removing solid particles 52 from a liquid stream 50, according to one embodiment. As mentioned above, many industrial processes require, or at least would benefit from, the ability to efficiently and effectively refine a liquid stream in order to harvest/collect elements mixed therein and/or recycle the refined liquid. Accordingly, as used throughout the present disclosure, the term "liquid stream" 50 refers to a liquid carrier 51 having solid particles 52 (and/or other liquids, see below with reference to FIGS. 9-18) mixed into the liquid carrier 51; that is, the liquid carrier 51 is the principal constituent of the liquid stream 50 and is the medium in which the solid particles are mixed. The solid particles 52 may be suspended, dispersed, mixed, entrained, or otherwise combined with the liquid carrier 51. The solid particles 52 have a specific gravity that is greater than the specific gravity of the liquid carrier 51. The difference between the specific gravities of the liquid carrier 51 and the solid particles 52 is a major driving force of a successful separation. In other words, the specific gravity of the liquid carrier 51 contrasted with the specific gravity of the solid particles 52 yields potential energy which is exploited in order to accomplish the separation. In one embodiment, for example, the liquid carrier 51 is water and the solid particles 52 are sediment from a drilling process. While reference is repeatedly made throughout the disclosure to separating solid particles from the liquid carrier, the apparatus 100 may be employed to separate any substance from the liquid carrier that has a higher specific gravity relative to the liquid carrier.

The apparatus 100 is configured to receive the liquid stream 50 through a liquid stream inlet 101 and to output collected solid particles 52 through a solids outlet 102 and a refined liquid carrier 51 through a liquid carrier outlet 103. The apparatus 100 has a first flow chamber 110, a second flow chamber 120, and a separation chamber 130 disposed between the first and second flow chambers 110, 120. The liquid stream 50 enters the first flow chamber 110 and flows in a first direction 111 at a first velocity. The first direction 111 is substantially parallel to gravity (i.e., downward) and the first velocity is greater than a settling velocity of the solid particles 52 in the liquid carrier 51. In other words, the downward speed of the liquid stream 50 in the first flow chamber 110 is greater than the speed of which the solid particles 52 would fall, due to gravity, through the liquid carrier 51. The settling velocity of specific solid particles 52 in a specific liquid carrier 51 can be calculated according to Stokes' law. For example, in applications in which the solid particles are comparatively more dense and thus have a higher settling velocity in water, the first velocity of the liquid stream 50 in the first flow chamber 110 would need to have a greater downward speed than a liquid stream with solid particles that are comparatively less dense.

After passing through the first flow chamber 110, the liquid stream flows into the separation chamber 130. The separation chamber has two portions, a redirection portion 132 and a collection portion 134. In the redirection portion 132, the flow direction of the liquid carrier 51 transitions from the first direction 111 to a second direction 121 opposite the first direction 111. In other words, the liquid carrier 51 is redirected 180 degrees and flows upwards into the second flow chamber 120. During this redirection, the liquid carrier 51 also slows from the first velocity to a second velocity. That is, the first velocity is defined as the velocity of the liquid stream 50 just before undergoing the 180 redirection in the redirection portion 132 of the separation chamber 130 and the second velocity is the velocity of the liquid carrier 51 just after the 180 degree redirection (e.g., the velocity of the liquid carrier 51 entering the second flow chamber). The magnitude (i.e., speed) of the second velocity is less than the first velocity and is also less than the above discussed settling velocity of the solid particles 52 in the liquid carrier 51. Throughout the present disclosure, flow directions are depicted in the figures and described herein. These flow directions (e.g., the first flow direction 111 and the second flow direction 121) represent an average, overall direction of flow. In other words, the flow directions shown in the figures and described herein refer to macro level flow patterns. Accordingly, while the average or overall flow of liquid may be in the indicated direction, eddys and other forms of turbulence may cause irregularities or non-uniformities in the micro level flow of the liquid.

The speed decrease of the liquid carrier 51, together with the 180 degree redirection of the liquid carrier 51, contribute to the solid particles 52 settling out (e.g., 'falling out') of the liquid carrier 51 and collecting in the collection portion 134 of the separation chamber 130. Thus, the apparatus 100 utilizes flow direction (e.g., the first direction 111 is parallel to gravity), flow redirection (e.g., changing from the first direction 111 parallel to gravity to the second direction 121 opposite gravity), and a change in flow velocities (e.g., slowing from the first velocity to the second velocity) to maximize the efficiency of the gravity separation.

The cross-sectional flow area of the second flow chamber 120 can be larger than the cross-sectional flow area of the first flow chamber 110 to slow the liquid carrier 51 down to the second velocity (which is less than or equal to the settling velocity of the solid particles 52 in the liquid carrier 51). In one embodiment, the cross-sectional area of the second flow chamber 120 is between about 1.5 and about 3 times larger than the cross-sectional area of the first flow chamber 110. In one embodiment, the first velocity is about twice the second velocity. In one embodiment, the first velocity is such that flow of the liquid stream 50 in the first flow chamber 110 is turbulent. In another embodiment, the second velocity is such that flow of the liquid carrier 51 in the second flow chamber 120 is laminar. The relative cross-sectional sizes of the first and second flow chambers 110, 120 can vary from application to application depending on the type of liquid carrier 51, the type of solid particles 52, and the relative specific gravities of the liquid carrier 51 and the solid particles 52, among other factors.

In addition to the speed decrease and the 180 degree redirection, the separation chamber 130 of the apparatus 100 may also include a configuration of inclined plates 140 disposed in the fluid flow path between the first and second flow chambers 110, 120. That is, the inclined plates 140 define inclined channels 249 (see FIG. 5) through which the liquid carrier 51 must flow while slowing from the first velocity to the second velocity and while redirecting from the first direction 111 to the second direction 121. Any solid particles 52 that have yet to settle out of the liquid carrier 51 due to the slowing and redirecting are promoted to settle via exposure to the extensive surface area of the inclined plates 140. Additional details regarding the inclined plates 140 are included below with reference to FIGS. 4-6.

According to one embodiment, the liquid carrier 51 enters (e.g., flows into) the configuration of inclined plates 140 sideways. In other words, the liquid carrier 51, with any remaining solid particles that have yet to settle into the collection portion 134 of the separation chamber 130, flows into the configuration of inclined plates 140 in a third direction 131 that is substantially perpendicular to the first and second directions 111, 121. Once again, the significance of entering the inclined plates 140 in a sideways direction and other details relating to the inclined plates 140 are included below.

The two portions 132, 134 of the separation chamber 130 are not physically well-defined or sharply delineated. That is, these portions 132, 134 of the separation chamber 130 are separately referred to herein according to the predominant and distinct flow characteristics of the liquid carrier 51 and solid particles 52 in the respective portions 132, 134. The liquid carrier 51 predominantly redirects in the redirection portion 132 of the separation chamber 130 and the solid particles 52 predominantly collect in the collection portion 134 of the separation chamber 130. Thus, in one embodiment, the separation chamber 130 does not have any physical features or barriers that distinguish the two portions 132, 134 from each other. For this reason, the redirection portion 132 and the collection portion 134 have been depicted in FIG. 1 as somewhat amorphous shapes.

The solid particles 52 that settle into the collection portion 134 of the separation chamber 130 can be extracted from the apparatus 100 via a solids outlet 102. In one embodiment, the apparatus 100 can be configured to continuously remove settled-solid particles 52 from the separation chamber. In another embodiment, batch-removal of the solid particles 52 may be performed periodically or upon the determination that a certain amount (e.g., volume, mass, weight, etc.) of solid particles 52 has settled in the collection portion 134 of the separation chamber 130. The solid particles 52 may be flushed, pumped, screwed, or suctioned out, among other methods, via the solids outlet 102.

In one embodiment, the apparatus 100 is free of (i.e., does not include) any flow-affecting moving parts. For example, in one embodiment the apparatus 100 does not have any agitators or vibrating elements to promote separation. In one embodiment, the apparatus 100 does not include any type of flocculation subsystem. While flocculation subsystems may be beneficial and may be included in certain embodiments, such as in applications in which the liquid carrier 51 and the solid particles 52 form a substantially stable colloidal suspension, the above discussed separation efficiency of the apparatus 100 may be sufficient to achieve a desired separation level without needing flocculation subsystems or any kind of interchangeable media. For example, the apparatus 100, without flow-affecting moving parts, flocculation subsystems, or interchangeable media, may be able to remove solid particles down to particle sizes ranging from about 1 micron to about 50 microns. In another embodiment, the apparatus 100, without flow-affecting moving parts, flocculation subsystems, or interchangeable media, may be able to remove solid particles down to less than 25 micron particle size. While such a result is dependent on the difference between the specific gravities of the carrier fluid 51 and the solid 52, such particle size separation range is generally expected when using the apparatus 100.

The second flow chamber 120 directs the liquid carrier 51, which is substantially free of solid particles down to a certain size, upwards in the second direction 121. The liquid carrier 51 can then flow out of the apparatus 100 via a refined liquid carrier outlet 103. In one embodiment, the apparatus 100 is cylindrical and one of the two flow chambers 110, 120 forms an annulus around the other. For example, the first flow chamber 110 may be a central channel and the second flow chamber 120 may be an annular channel that surrounds and is concentric with the first flow chamber 110. In such an embodiment, the third direction 131 (i.e., the direction of the flow of the carrier fluid 51 into the configuration of inclined plates 140) is radially outward.

Figure 2:
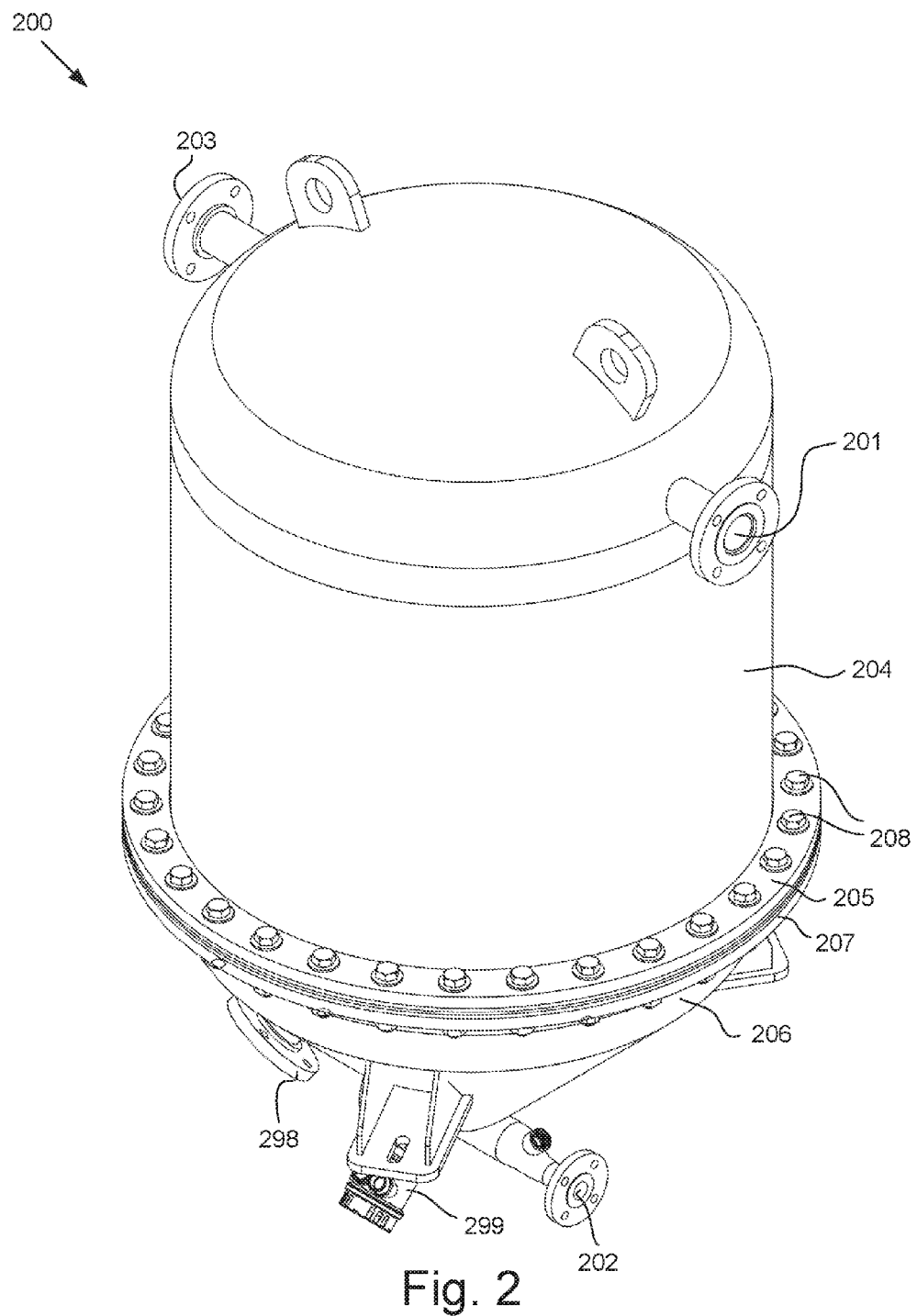
FIG. 2 is a perspective view of an apparatus for removing solid particles from a liquid stream, according to one embodiment.
Figure 3:
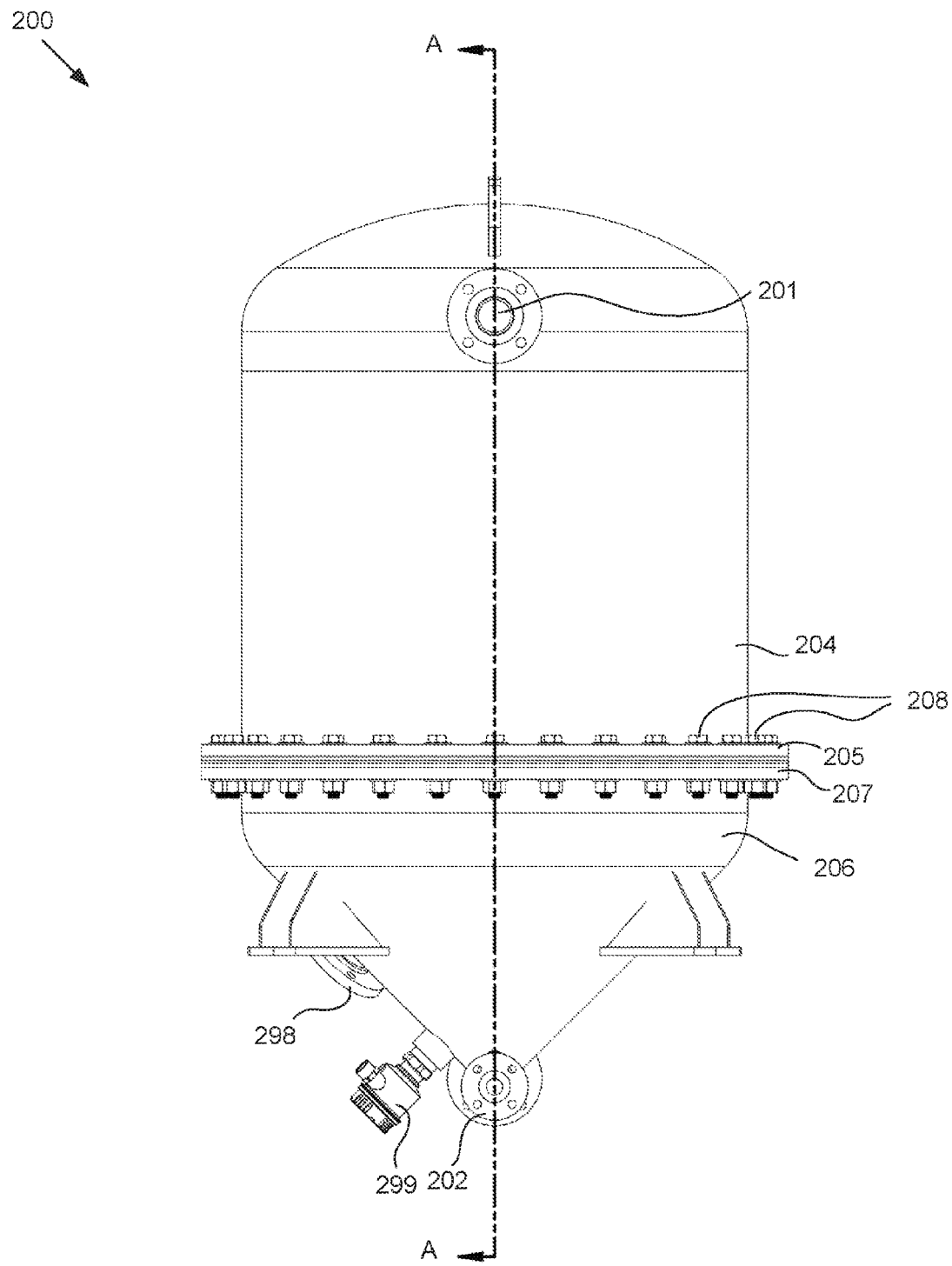
FIG. 3 is a side view of the apparatus of FIG. 2, according to one embodiment.
Figure 4:
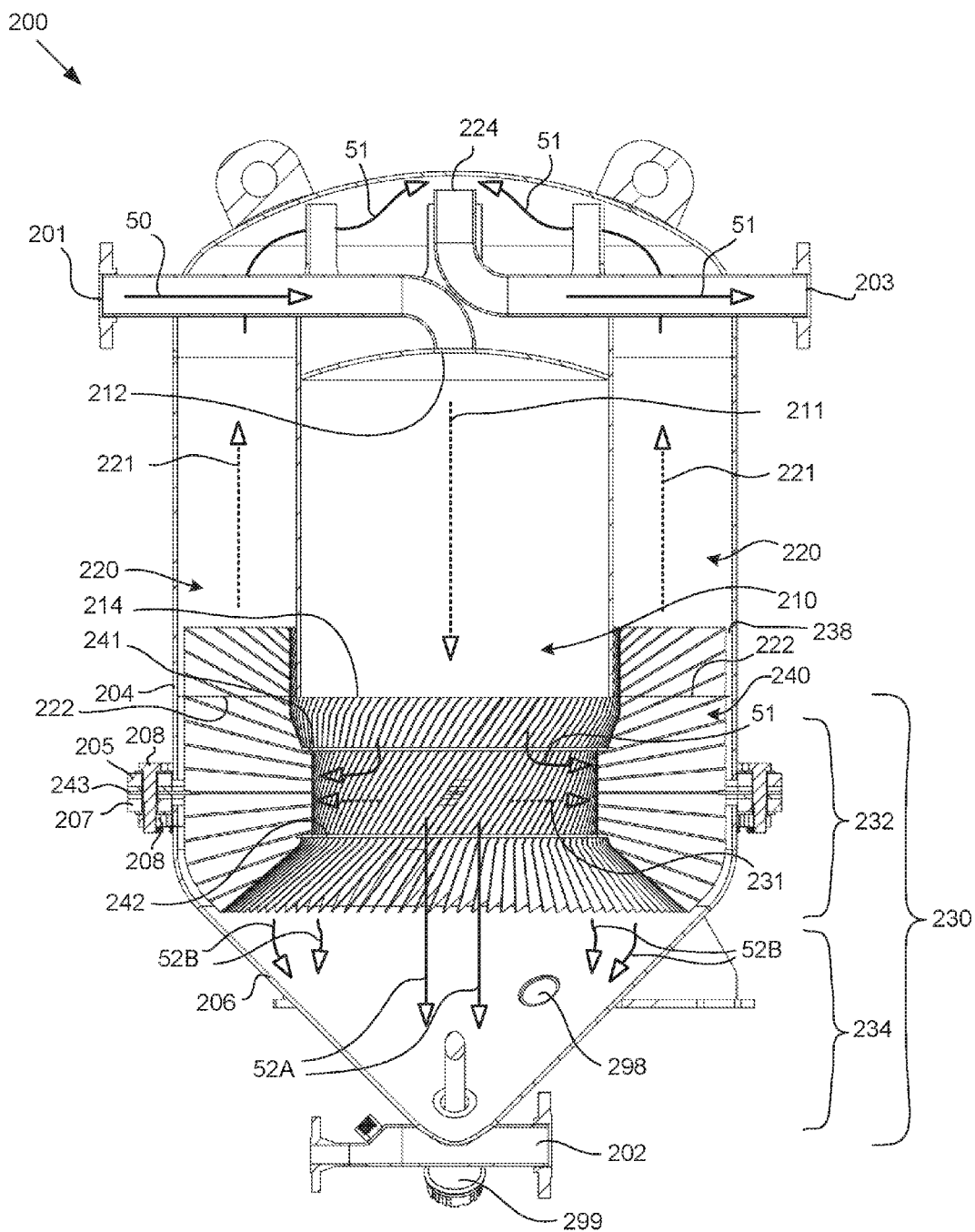
FIG. 4 is a cross-sectional view, as seen from reference plane A shown in FIG. 3. of the apparatus of FIG. 3, according to one embodiment.

FIGS. 2-4 illustrate various views of another embodiment of the apparatus 200 for removing solid particles 52 from the liquid stream 50. More specifically, FIG. 2 is a perspective view, FIG. 3 is a side view, and FIG. 4 is a cross-sectional view, as seen from reference plane A shown in FIG. 3, of the apparatus 200.

The apparatus 200, which is similar to the embodiment of the apparatus 100 shown in FIG. 1, has a cylindrical tank structure. The apparatus 200 includes a liquid stream inlet 201 and a refined liquid carrier outlet 203. In the depicted embodiment, the liquid stream inlet 201 and the refined liquid carrier outlet 203 are disposed on opposite sides of the apparatus 200. The apparatus 200 also includes multiple ports 202, 299, 298 disposed near the bottom of the apparatus 200. The port at the bottom of the apparatus 200 is the solid outlet 202. The solid particles that fall out of the liquid carrier and collect in a bottom portion 206 of the apparatus 200 can be removed from the apparatus 200 via the solid outlet 202 by gravity flow, pressure from an inlet pump, pressure from a pump independent of the inlet pumps, and/or a screw mechanism. The other ports 299, 298 are used for various types of instruments that can detect the level of the solids accumulating in the bottom portion 206 of the apparatus. In one embodiment the lower port 299 is used for a tuning fork or similar instrument that measures denser particles. The higher port 298 may be another density detection device that measures lower density solids that settle out slower or may form in a "rag layer" in an upper area of the bottom portion 206, just below the inclined plates 240.

Figure 5:
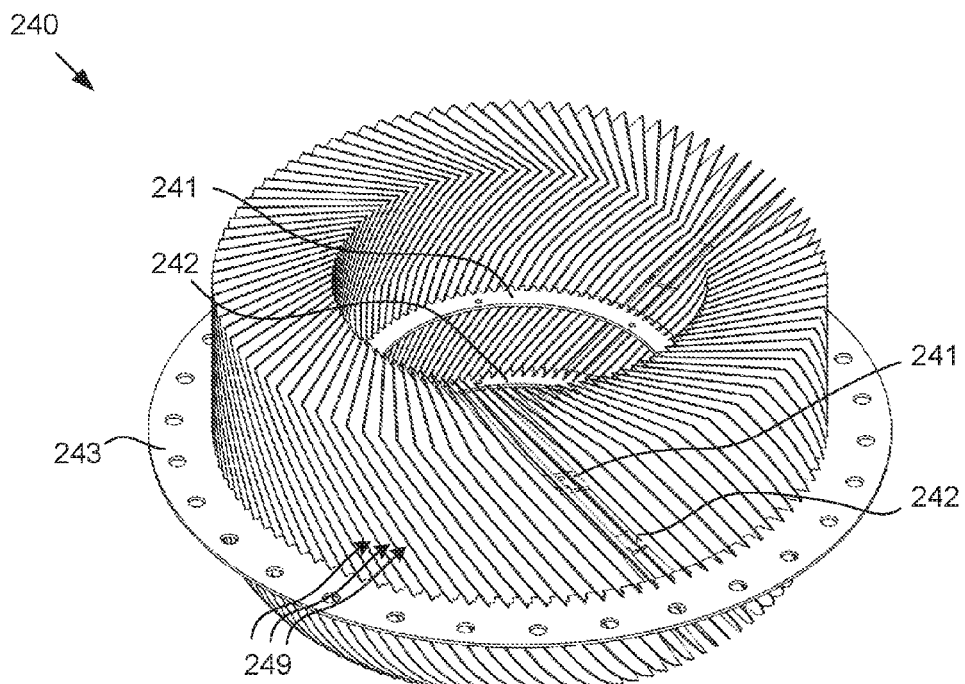
FIG. 5 is a perspective view of the inclined plate-pack of FIG. 4, according to one embodiment.
Figure 6:
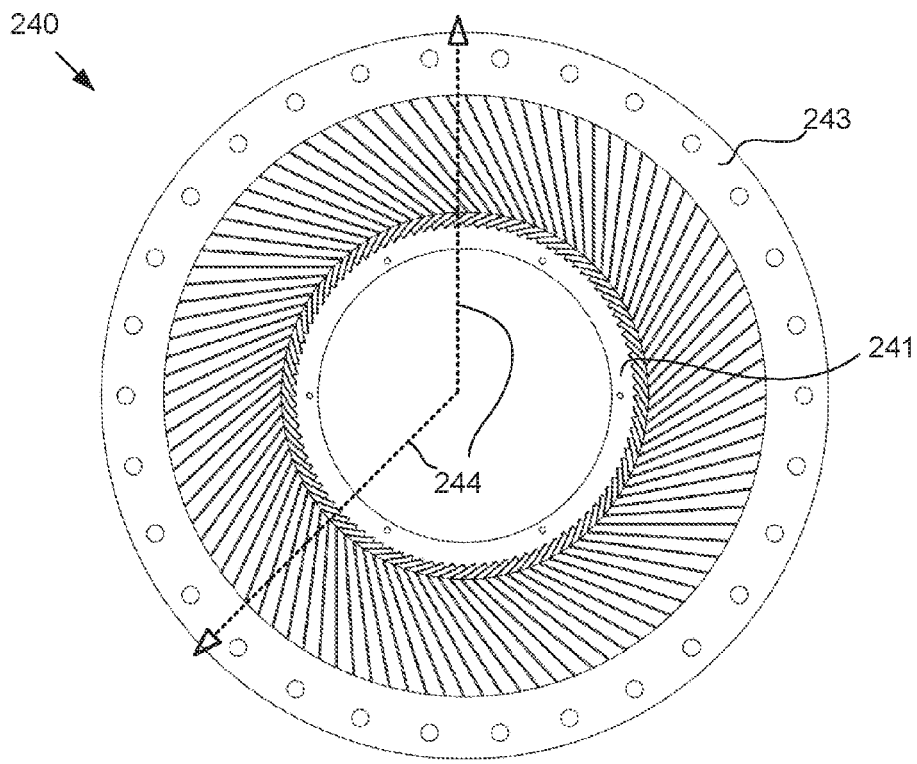
FIG. 6 is a top view of the inclined plate-pack of FIG. 5, according to one embodiment.

In the depicted embodiment, the housing of the apparatus 200 includes an upper portion 204 and a lower portion 206 that are detachably coupled together. As described below, the detachable coupling between the upper and lower portions 204, 206 allows easy access to the interior of the apparatus 200 for maintenance, repair, etc. The upper portion 204 has an upper flange 205 that couples to a corresponding lower flange 207 of the lower portion 206. Fasteners 208, such as bolts and nuts, may be employed to securely hold the two portions 204, 206 together. In one embodiment, as shown in FIGS. 4-6, the configuration of inclined plates 240 may have an external flange 243 that is sandwiched between the upper and lower flanges 205, 207 of the housing of the apparatus 200. In such an embodiment, the fasteners 208 that hold the two portions 204, 206 of the housing together also serve to secure the configuration of the inclined plates 240. In certain applications it may be beneficial for the inclined plates 140 (i.e., the "plate pack" 140) to be removable from the apparatus 200, thereby enabling a user to swap out plate packs, repair plate packs, or clean plate packs, etc.

The apparatus 200 is configured to receive the liquid stream 50 through a liquid stream inlet 201 disposed on one side of the upper portion 204 of the apparatus 200. The liquid stream 50 flows through a pipe to the first flow chamber 210, which is the central chamber of the apparatus 200. The liquid stream 50 flows out of the inlet pipe through an inlet 212 of the first flow chamber 210. The liquid stream 50 in the first flow chamber 210 flows in the first direction 211 at the first velocity. Once again, the first direction 211 is substantially parallel to gravity (i.e., downward) and the first velocity is greater than the settling velocity of the solid particles 52 in the liquid carrier 51.

After passing through the first flow chamber 210, the liquid carrier 51 flows into the separation chamber 230. The separation chamber 230 has the redirection portion 232 and the collection portion 234. In the redirection portion 232, the flow direction of the liquid carrier 51 transitions from the first direction 211 to the second direction 221. The cross-sectional flow area of the second flow chamber 220 is larger than the cross-sectional flow area of the first flow chamber 210 to slow the liquid carrier 51 down to the second velocity (which is less than or equal to the settling velocity of the solid particles 52 in the liquid carrier 51).

The inclined plates 240 are disposed in the separation chamber 230 and fluidly couple an outlet 214 of the first flow chamber 210 and an inlet 222 of the second flow chamber 220. FIGS. 5 and 6 show views of the annular formation of the inclined plates 240 removed from the housing of the apparatus 200. More specifically, FIG. 5 is a perspective view of the annular formation of the inclined plates 240 and FIG. 6 is a top view of the annular formation of inclined plates 240, according to one embodiment.

In the depicted embodiment, the inclined plates 240 are disposed in the redirection portion 232 of the separation chamber 230 and are circumferentially spaced apart in an annular formation. The inclined plates 240 are secured together in the annular formation (e.g., instead of being loose and independently movable). The annular formation of inclined plates 240 is held together, as a unit, by 'ring flanges'. In other words, the annular formation of the inclined plates 240 has an external flange 243 and one or more internal flanges. In the depicted embodiment, the annular formation of inclined plates 240 has two internal flanges 241, 242. The individual plates are mounted between the external flange 243 and the internal flanges 241, 242. The external flange 243, as described above, engages the upper and lower flanges 205, 207 of the housing of the apparatus 200 to secure the position of the annular formation of the inclined plates 240 within the apparatus 200. The first internal flange 241 of the inclined plates 240 is positioned higher (relative to the gravity vector) than the external flange 243 and the second internal flange 242 is positioned lower than the external flange 243 (e.g., see FIG. 4). Such a configuration yields a unit of inclined plates 240 that has structural rigidity.

The annular formation of inclined plates 240 is positioned proximate the inlet 222 of, and substantially concentric with the annulus that is, the second flow chamber 220. In one embodiment, the inclined plates 240 extend partially into the second flow chamber 220. That is, a portion of the inclined plates 240 extends beyond the inlet 222 of the second flow chamber 220. Such a configuration may improve the degree of separation that is achieved by extending the surface area of the inclined plates 240 above the outlet 214 of the first flow chamber 210.

In another embodiment, more than half of the height of the annular formation of the inclined plates 240 extends above the external flange 243. Said differently, a major portion of the annular formation of inclined plates 240 extends above the external flange 243 while a minor portion extends below the external flange 243. In such a configuration, a greater portion of the total height of the annular formation of inclined plates 240 extends into the upper portion 204 of the apparatus 200 than the lower portion 206 of the apparatus 200. As mentioned above, the lower portion 206 of the apparatus 200 may have a conical shape that helps to funnel the settling solid particles 52B to the very bottom of the apparatus 200 for extraction via the solids outlets 202. In one embodiment, the annular formation of the inclined plates 240 extends partially into the conical section of the lower portion 206 of the apparatus 200. As shown in FIG. 4, and according to one embodiment, the internal diameter of the annular formation of the inclined plates 240 is narrowest between the first and second internal flanges 241, 242.

The space between adjacent inclined plates, defined above as inclined channels 249 (e.g., see FIG. 5), may be dependent on the specifics of a given application. For example, the spacing between the inclined plates 240 may be dependent on the concentration of solid particles in the liquid carrier and/or the average expected size of the solid particles. In one embodiment, the spacing between adjacent inclined plates (i.e., the thickness of the inclined channels 249) is between about 0.25 inches and about 1 inch. In another embodiment, the spacing between adjacent inclined plates is about 0.5 inches. In one embodiment, the spacing between adjacent plates is uniform throughout the annular formation.

In one embodiment, the spacing between adjacent plates is less than conventional plate-type clarifiers. For example, conventional plate-type clarifiers may experience plugging or clogging because the entire flow of the liquid stream, or at least a major extent of the flow of the liquid stream, is channeled directly towards the plates in conventional clarifiers and/or conventional clarifiers do not incorporate a 180 degree redirection aligned with gravity or a decrease in velocity. In other words, the apparatus 200 of the present disclosure is especially effective and efficient because, according to the embodiment depicted in FIG. 4, the larger, denser solid particles 52A flow right through the center core of the annular formation of the inclined plates 240 without flowing in the third direction 231 into the inclined channels 249 defined by the inclined plates 240. Because the largest and/or most dense solid particles do not pass across the inclined plates 240, the annular formation of inclined plates 240 is comparatively less prone to clogging and plugging.

As mentioned above, the smaller, less dense solid particles 52B flow sideways (e.g., flow in the third direction 231) with the liquid carrier 51 across the inclined plates 240 (i.e., into and through the channels 249). By entering the inclined channels in a substantially sideways direction 231, the plate separation process is not working directly against gravity (e.g., like some conventional up-flow clarifiers). In one embodiment, the size and dimension of the annular formation of the inclined plates 240 is such that a gap 238 is left between the external perimeter of the annular formation of the inclined plates 240 and the inner sidewalls of the separation chamber 230. Because the liquid carrier 51 enters the channels 249 sideways 231, any solid particles that remain entrained with the liquid carrier 51 after crossing the inclined plates 240 will catch on the edge and be directed downward towards the collection portion 234 through the gap 238.

In one embodiment, the slope of the inclined plates 240, relative to horizontal, is between about 20 degrees and about 65 degrees. In another embodiment, the slope of the inclined plates 240, relative to horizontal, is about 55 degrees. As mentioned above, where conventional clarifiers may experience plugging or clogging, the apparatus 200 of the present disclosure may allow for a comparatively wider range of possible slopes for the inclined plates 240. In another embodiment, as shown in FIG. 6, the inclined plates 240 are not only inclined relative to horizontal, but the inclined plates 240 are also angled relative to a radius 244 of the annular formation of inclined plates 240. That is, the inclined plates 240 are not aligned parallel with radii of the annular formation, but instead are offset from the radii of the annular formation.

In one embodiment, the inclined plates may be electrostatically charged to further promote separation. In yet another embodiment, certain edges of the plates 240 may be bent to facilitate settling of the solid particles. As mentioned above, the apparatus 200 may be free of (i.e., does not include) any flow-affecting moving parts. For example, in one embodiment the apparatus 200 does not have any agitators or vibrating elements to promote separation.

While most of the figures of the present disclosure depicted cylindrical embodiments of the apparatus 200, it is expected that the apparatus can have other shapes or structures. Additionally, the apparatus 200 can be built from any type of metal, composite, and/or plastic material. The lower portion 206 of the apparatus 200, as mentioned above, may be conical in shape to facilitate collection of the solid particles. In another embodiment, the lower portion 206 may be dish-shaped or semi-circular. The upper portion 204 may be flat, dished, coned, flanged, or welded. The apparatus 20 can be operated at atmospheric conditions or under pressure. The size and dimensions of the apparatus may be tailored for a specific application.

Figure 7:
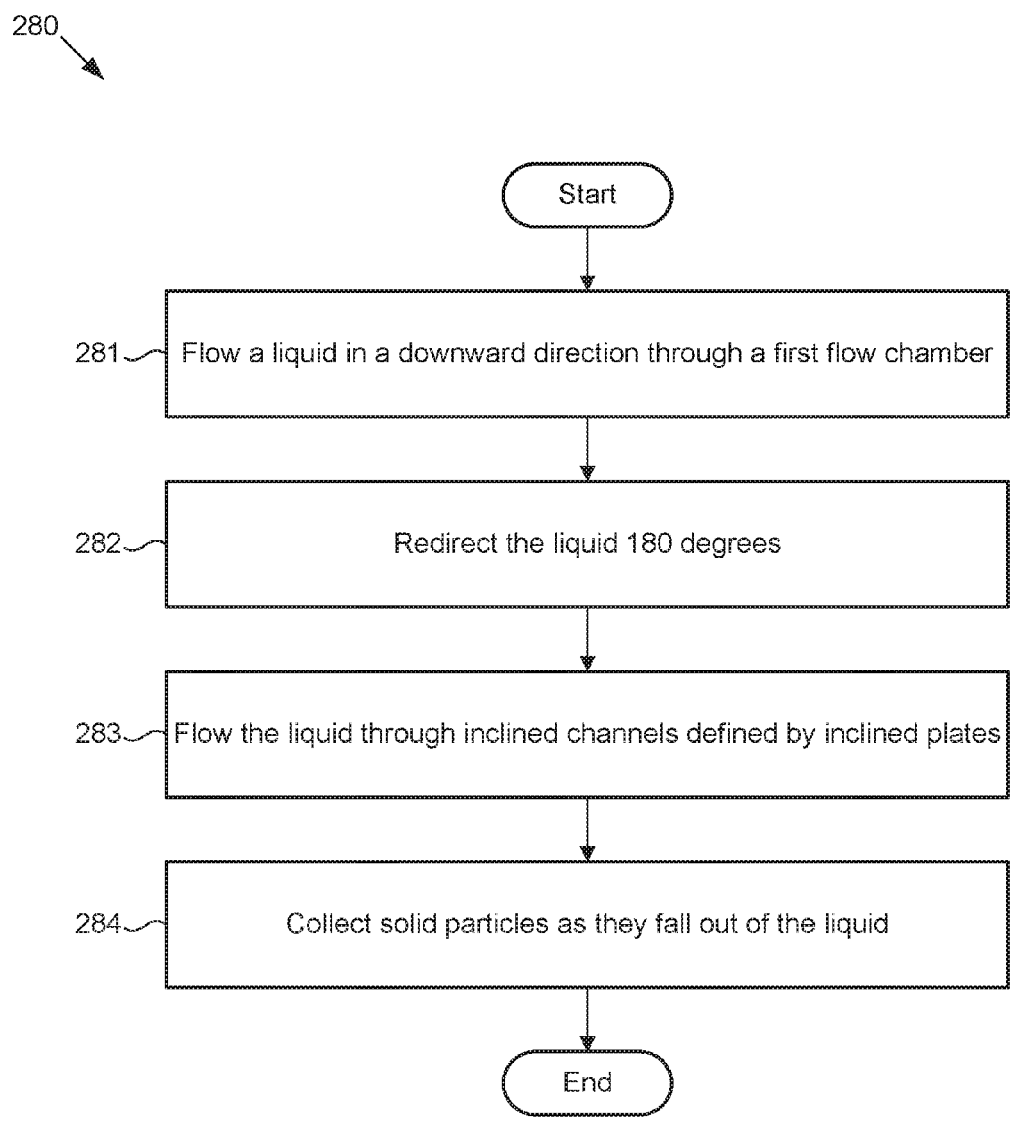
FIG. 7 is a schematic flow chart diagram of a method for removing solid particles from a liquid stream, according to one embodiment.

FIG. 7 is a schematic flow chart diagram of a method 280 for removing solid particles from a liquid stream, according to one embodiment. The liquid stream includes a liquid carrier that has solid particles mixed therein. The solid particles have a specific gravity that is greater than the specific gravity of the liquid carrier. The method 280 includes flowing the liquid stream through a first flow chamber in a first direction at a first velocity at 281. The first direction is substantially parallel to gravity and the first velocity is greater than a settling velocity of the solid particles in the liquid carrier. The method 280 further includes redirecting the liquid carrier 180 degrees such that the liquid carrier flows into a second flow chamber in a second direction opposite the first direction at a second velocity less than the settling velocity at 282. During redirecting the liquid carrier, the liquid carrier flows into inclined channels at 283, which are defined by inclined plates and fluidly couple an outlet of the first flow chamber and an inlet of the second flow chamber, in a third direction substantially perpendicular to the first and second directions. The method 280 also includes collecting the solid particles as the solid particles fall out of the liquid carrier during redirecting the liquid carrier at 284.

In one embodiment, the method includes electrostatically charging the inclined plates. In another embodiment, the first velocity is about twice the second velocity.

Figure 8:
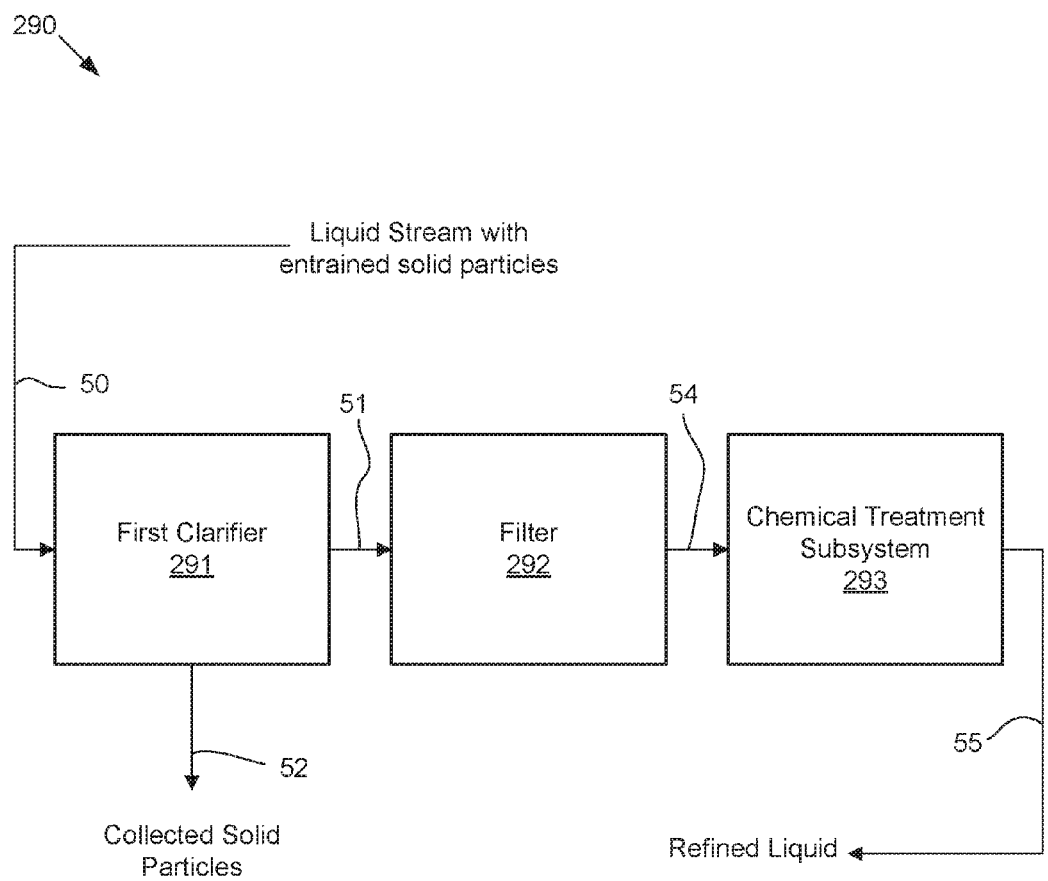
FIG. 8 is a schematic block diagram of a system for removing solid particles from a liquid stream, according to one embodiment.

FIG. 8 is a schematic block diagram of a system 290 for removing solid particles from a liquid stream 50, according to one embodiment. The system 290 includes a first clarifier 291 that separates the solid particles from the liquid carrier 291 by redirecting flow of the liquid carrier 180 degrees from a first direction parallel to gravity at a first velocity to a second direction at a second velocity. The first velocity is greater than a settling velocity of the solid particles in the liquid carrier and the second velocity is less than the settling velocity. During redirection of the liquid carrier the liquid carrier flows into inclined channels defined by inclined plates in a third direction substantially perpendicular to the first and second directions. The system also includes a chemical treatment subsystem 293 that receives and disinfects the liquid carrier 51 from the first clarifier 291 and a filter 292 that receives and further clarifies the liquid carrier 51 from the first clarifier subsystem 291. In one embodiment, the filter 292 receives the refined liquid carrier 51 from the first clarifier 291 before the chemical treatment subsystem 293. In another embodiment, the chemical treatment subsystem 293 receives the refined liquid carrier 51 from the first clarifier 291 before the filter 292. Regardless the order, the filtered liquid carrier 54 and the chemically treated liquid carrier 55 constitute a refined liquid stream. In one embodiment, the system 290 further includes one or more of the following: a pH adjustment subsystem, a de-emulsifier subsystem, a desalination subsystem, and a flocculant subsystem.

Figure 9:
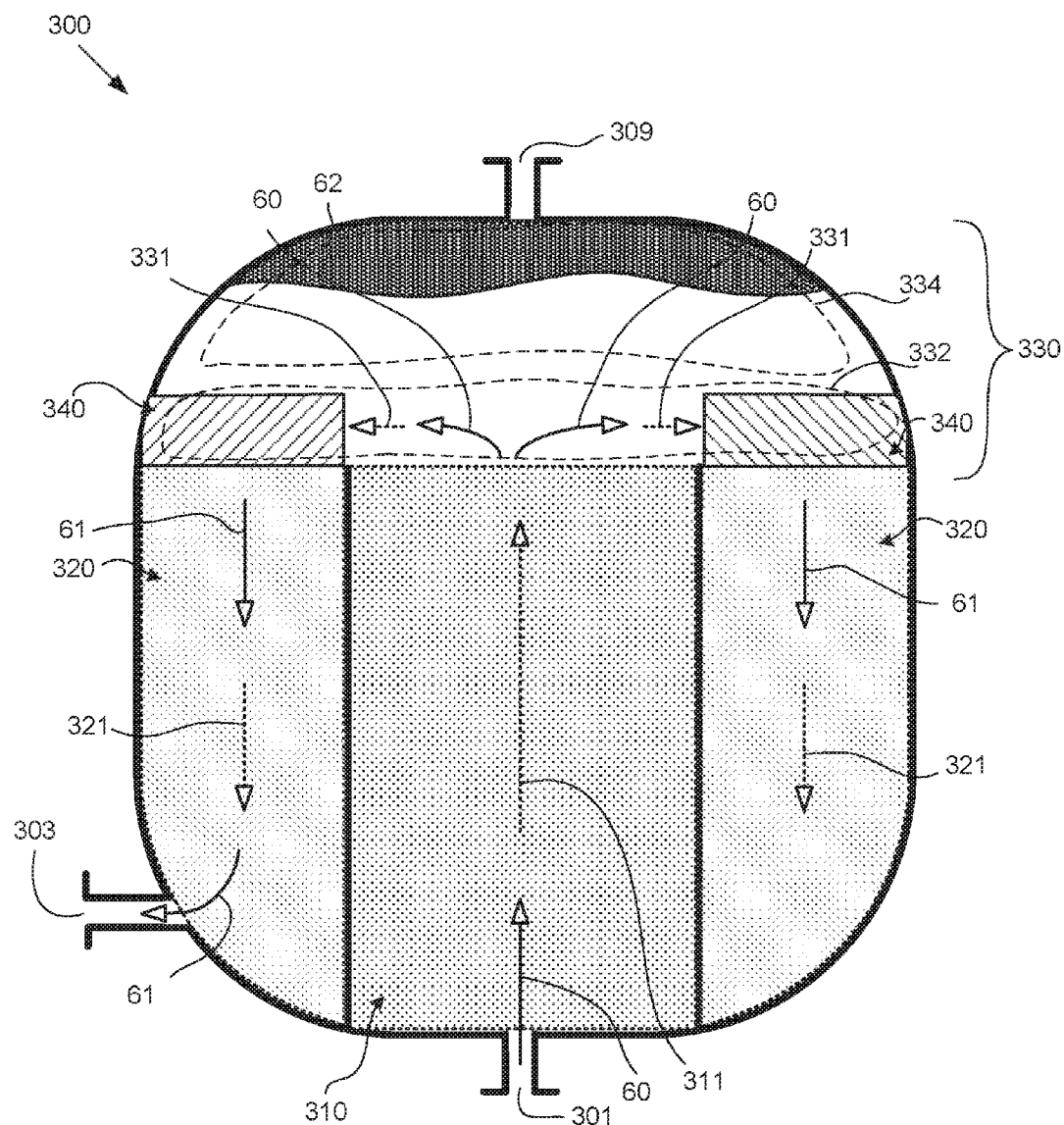
FIG. 9 is a schematic, cross-sectional view of an apparatus for removing a lower-density liquid from a liquid stream, according to one embodiment.

FIG. 9 is a schematic, cross-sectional view of the apparatus 300 for removing a lower-density liquid 62 from a liquid stream 60, according to one embodiment. The depicted embodiment of the apparatus 300 is similar in concept to the previously described embodiments with regard to a 180 degree redirection, a decreased flow velocity, and inclined plates. However, the apparatus 300 of FIG. 9 is utilized for separating a lower-density liquid 62 from a liquid carrier 61.

As mentioned above, the lower-density liquid 62 refers to a liquid that has a specific gravity that is less than the specific gravity of the liquid carrier 61. The difference between the specific gravities of the liquid carrier 61 and the lower-density liquid 62 is a major driving force of a successful separation. In other words, the specific gravity of the liquid carrier 61 contrasted with the specific gravity of the lower-density liquid 62 yields potential energy which is exploited in order to accomplish the separation. In one embodiment, for example, the liquid carrier 61 is water and the lower-density liquid 62 is oil or other hydrocarbons.

The apparatus 300 is configured to receive the liquid stream 60 through a liquid stream inlet 301 and to output collected lower-density liquid 62 through a lower-density liquids outlet 309 and a refined liquid carrier 61 through a liquid carrier outlet 303. The apparatus 300 has a first flow chamber 310, a second flow chamber 320, and a separation chamber 330 disposed between the first and second flow chambers 310, 320. The liquid stream 60 enters the first flow chamber 310 and flows through the first flow chamber 310 in a first direction 311. The velocity of the liquid stream 60 upon exiting the first flow chamber 310 is referred to as the first velocity. The first direction 311 is opposite gravity (i.e., upwards) and the first velocity is greater than a rise-velocity of the lower-density liquid 62 in the liquid carrier 61. In other words, the upward speed of the liquid stream 60 in the first flow chamber 310 is greater than the speed of which the lower-density liquid 62 would rise, due to buoyancy, through the liquid carrier 61. The rise-velocity of specific lower-density liquid droplets 62 in a specific liquid carrier can be calculated according to Stokes' law.

After passing through the first flow chamber 310, the liquid stream flows into the separation chamber 330. The separation chamber 330 has two portions, a redirection portion 332 and a collection portion 334. In the redirection portion 332, the flow direction of the liquid carrier 61 transitions from the first direction 311 to a second direction 321 opposite the first direction 311. In other words, the liquid carrier 61 is redirected 180 degrees and flows downwards into the second flow chamber 320. During this redirection, the liquid carrier 61 also slows from the first velocity to a second velocity. The magnitude (i.e., speed) of the second velocity is less than the first velocity and is also less than the above discussed rise-velocity of the lower-density liquid 62 in the liquid carrier 61.

The speed decrease of the liquid carrier 61, together with the 180 degree redirection of the liquid carrier 61, contribute to the lower-density liquid 62 rising out of the liquid carrier 61 and collecting in the collection portion 334 of the separation chamber 330. Thus, the apparatus 300 utilizes flow direction (e.g., the first direction 311 is opposite to gravity), flow redirection (e.g., changing from the first direction 311 opposite gravity to the second direction 321 parallel to gravity), and a change in flow velocities (e.g., slowing from the first velocity to the second velocity) to maximize the efficiency of the gravity separation.

The cross-sectional flow area of the second flow chamber 320 is larger than the cross-sectional flow area of the first flow chamber 310 to slow the liquid carrier 61 down to the second velocity (which is less than or equal to the rise-velocity of the lower-density liquid 62 in the liquid carrier 61). In one embodiment, the cross-sectional area of the second flow chamber 320 is between about 1.5 and about 3 times larger than the cross-sectional area of the first flow chamber 310. In one embodiment, the first velocity is about twice the second velocity. In one embodiment, the first velocity is such that flow of the liquid stream 60 in the first flow chamber 310 may be turbulent or laminar. In another embodiment, the second velocity is such that flow of the liquid carrier 61 in the second flow chamber 320 is always laminar. The relative cross-sectional sizes of the first and second flow chambers 310, 320 can vary from application to application depending on the type of liquid carrier 61, the type of lower-density liquid 62, and the relative specific gravities of the liquid carrier 61 and the lower-density liquid 62, among other factors.

In addition to the speed decrease and the 180 degree redirection, the separation chamber 330 of the apparatus 300 may also include a configuration of inclined plates 340 disposed in the fluid flow path between the first and second flow chambers 310, 320. That is, the inclined plates 340 define inclined channels (e.g., similar to the inclined channels 249 in FIG. 5) through which the liquid carrier 61 must flow while slowing from the first velocity to the second velocity and while redirecting from the first direction 311 to the second direction 321. Any lower-density liquid droplets 62 that have yet to rise out of the liquid carrier 61 due to the slowing and redirecting are promoted to settle via exposure to the extensive surface area of the inclined plates 340. The inclined plates 340 may be substantially similar to the inclined plates 240 described above with reference to FIGS. 4-6.

According to one embodiment, the liquid carrier 61 enters (e.g., flows into) the configuration of inclined plates 340 sideways. In other words, the liquid carrier 61, with any remaining lower-density liquid droplets that have yet to rise into the collection portion 334 of the separation chamber 330, flows into the configuration of inclined plates 340 in a third direction 331 that is substantially perpendicular to the first and second directions 311, 321.

The two portions 332, 334 of the separation chamber 330 are not physically well-defined or sharply delineated. That is, these portions 332, 334 of the separation chamber 330 are separately referred to herein according to the predominant and distinct flow characteristics of the liquid carrier 61 and lower-density liquid 62 in the respective portions 332, 334. The liquid carrier 61 predominantly redirects in the redirection portion 332 of the separation chamber 330 and the lower-density liquid 62 predominantly collects in the collection portion 334 of the separation chamber 330. Thus, in one embodiment, the separation chamber 330 does not have any physical features or barriers that distinguish the two portions 332, 334 from each other. For this reason, the redirection portion 332 and the collection portion 334 have been depicted in FIG. 1 as somewhat amorphous shapes.

The lower-density liquid 62 that rises into the collection portion 334 of the separation chamber 330 can be extracted from the apparatus 300 via a lower-density liquid outlet 309. In one embodiment, the apparatus 300 can be configured to continuously remove lower-density liquid 62 from the separation chamber 330. In another embodiment, batch-removal of the lower-density liquid 62 may be performed periodically or upon the determination that a certain amount (e.g., volume, mass, weight, etc.) of lower-density liquid 62 has settled in the collection portion 334 of the separation chamber 330. The lower-density liquid may be flushed, pumped, or suctioned out, among other methods, via the lower-density liquid outlet 309.

In one embodiment, the apparatus 300 is free of (i.e., does not include) any flow-affecting moving parts. For example, in one embodiment the apparatus 300 does not have any agitators or vibrating elements to promote separation.

The second flow chamber 320 directs the liquid carrier 61, which is substantially free of lower-density liquid down to a certain size, downwards in the second direction 321. In one embodiment, the apparatus 300 removes hydrocarbons down to a droplet size ranging from about 5 microns to about 100 microns, depending on various factors, including the specific gravity differential, particle size, temperature, viscosity, and flow rate (e.g., Stokes' Law variables). The liquid carrier 61 can then flow out of the apparatus 300 via a refined liquid carrier outlet 303. In one embodiment, the apparatus 300 is cylindrical and one of the two flow chambers 310, 320 forms an annulus around the other. For example, the first flow chamber 310 may be a central channel and the second flow chamber 320 may be an annular channel that surrounds and is concentric with the first flow chamber 310. In such an embodiment, the third direction 331 (i.e., the direction of the flow of the carrier fluid 61 into the configuration of inclined plates 340) is radially outward.

Figure 10:
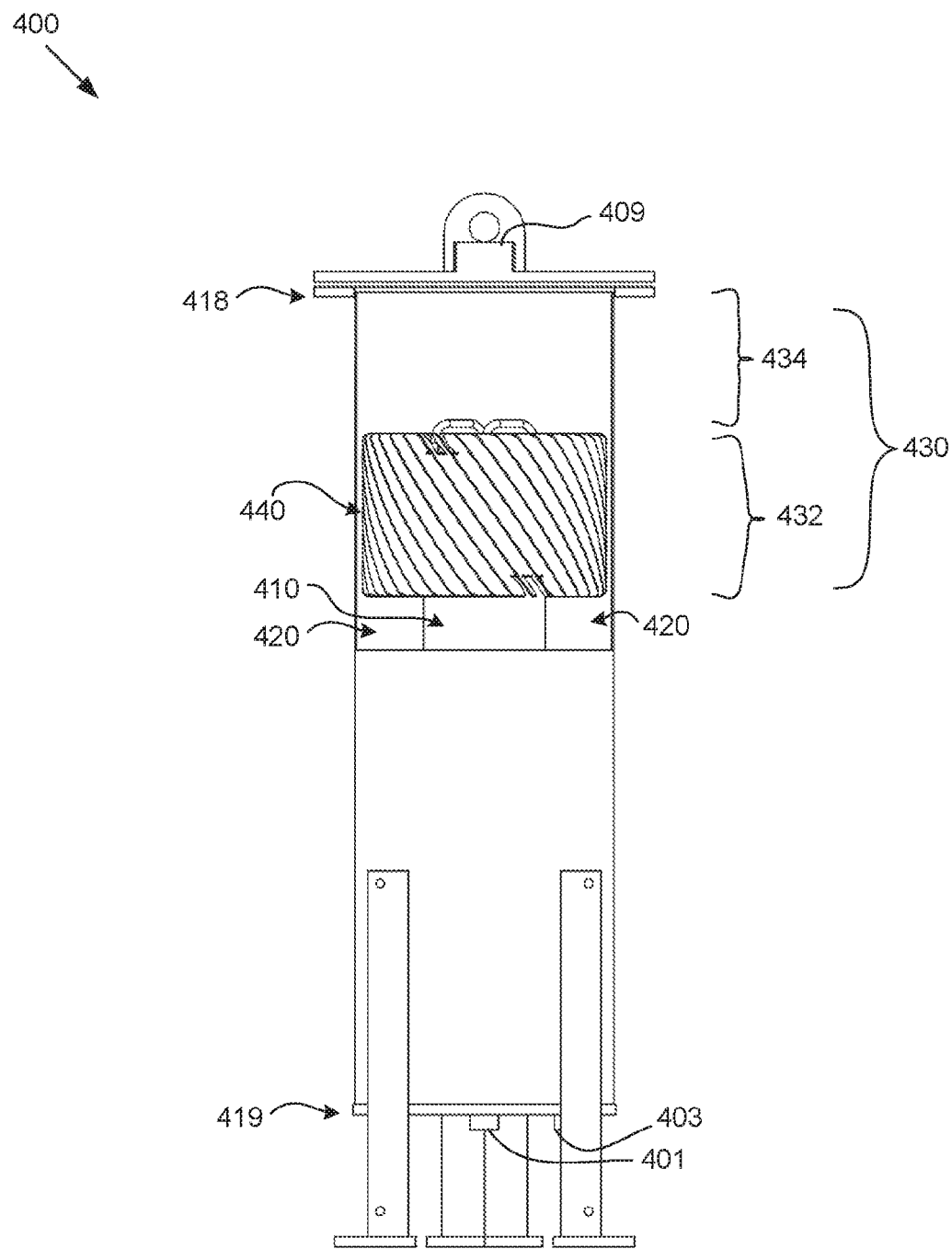
FIG. 10 is a cross-section view of one embodiment of an apparatus for removing a lower-density liquid from a liquid stream.

FIG. 10 is a cross-section view of one embodiment of the apparatus 400 for removing the lower-density liquid from the liquid stream. Similar and analogous to the schematic depiction of FIG. 9, the embodiment of the apparatus 400 in FIG. 10 has a first flow chamber 410 that receives the liquid stream from the liquid stream inlet 401. The first flow chamber 410 directs flow in an upwards direction. Upon exiting the first flow chamber, the liquid carrier flows across multiple inclined plates 440 disposed in the redirection portion 432 of the separation chamber 430. As the liquid stream flows across the inclined plates 440, the lower-density liquid separates from the liquid carrier. The separated lower-density liquid collects in the collection portion 434 of the separation chamber 430. The liquid carrier flows out of the configuration of inclined plates 440 and enters the second flow chamber 420. The refined liquid carrier flows in a downward direction through the second flow chamber 420.

In the depicted embodiment, the apparatus 400 has top and bottom heads 418, 419 that are flat. In other embodiments, the top and bottom heads 418, 419 can be torispherical, elliptical, conical, hemispherical, etc. In one embodiment, the apparatus 400 has coalescing media disposed in one or both of the first and second flow chambers 410, 420. The coalescing media may polypropylene, polyethylene, or some other type of coalescing-inducing material.

Figure 11:
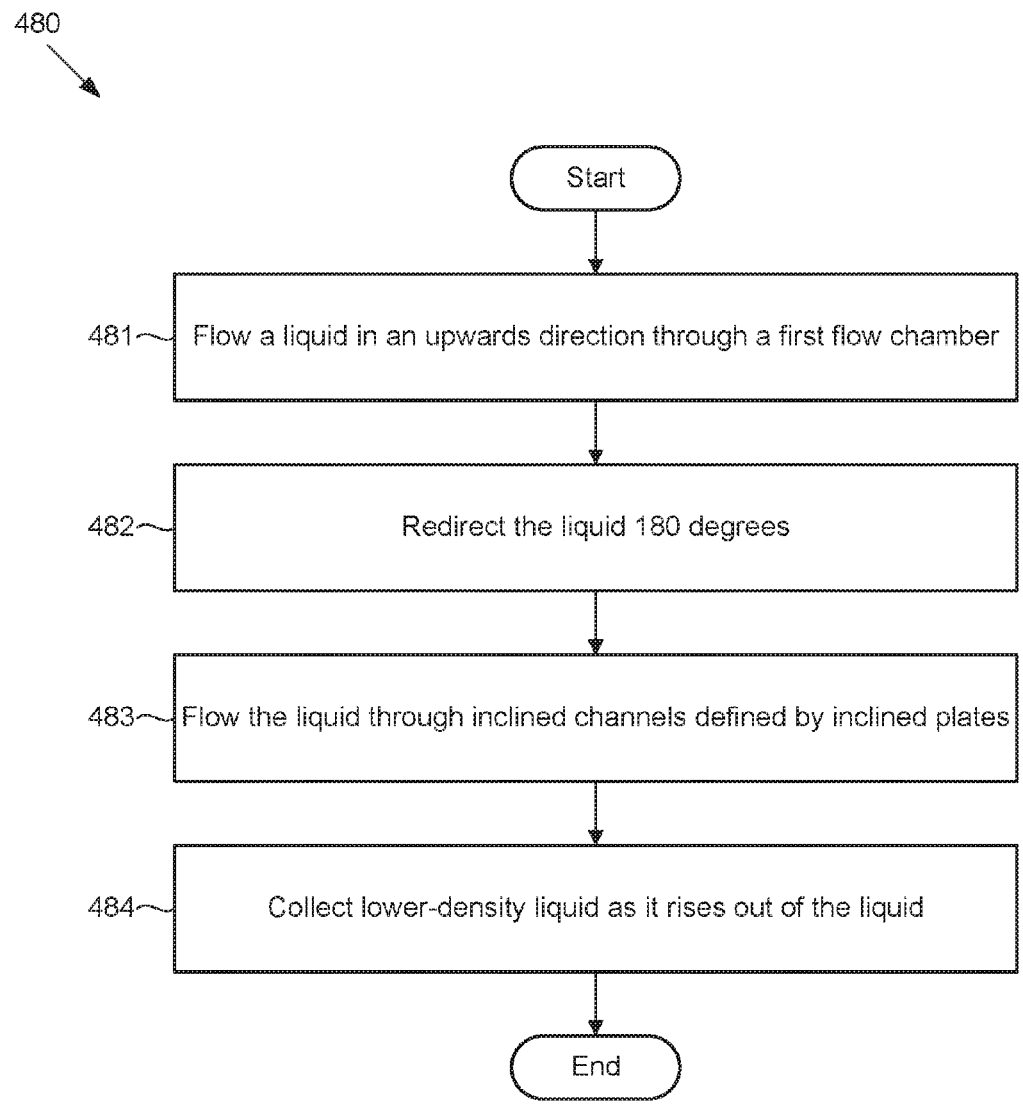
FIG. 11 is a schematic flow chart diagram of a method for removing a lower-density liquid from a liquid stream, according to one embodiment.

FIG. 11 is a schematic flow chart diagram of a method 480 for removing a lower-density liquid from a liquid stream, according to one embodiment. The liquid stream includes a liquid carrier having a lower-density liquid mixed therein and the lower-density liquid has a specific gravity that is less than a specific gravity of the liquid carrier. The method 480 includes flowing the liquid stream through a first flow chamber in a first direction at a first velocity at 481. The first direction is substantially opposite gravity and the first velocity is greater than a rise-velocity of the lower-density liquid in the liquid carrier. The method 480 further includes redirecting the liquid carrier 180 degrees such that the liquid carrier flows through a second flow chamber in a second direction opposite the first direction at a second velocity less than the rise-velocity at 482. The method 480 further includes flowing the liquid carrier out of inclined channels in a third direction substantially perpendicular to the first and second directions at 483. The inclined channels are defined by inclined plates and fluidly couple an outlet of the first flow chamber and an inlet of the second flow chamber. The method 480 further includes collecting the lower-density liquid as the lower-density liquid rises out of the liquid carrier during redirecting the liquid carrier at 484.

In one embodiment, the method includes electrostatically charging the inclined plates. In another embodiment, the first velocity is about twice the second velocity.

Figure 12:
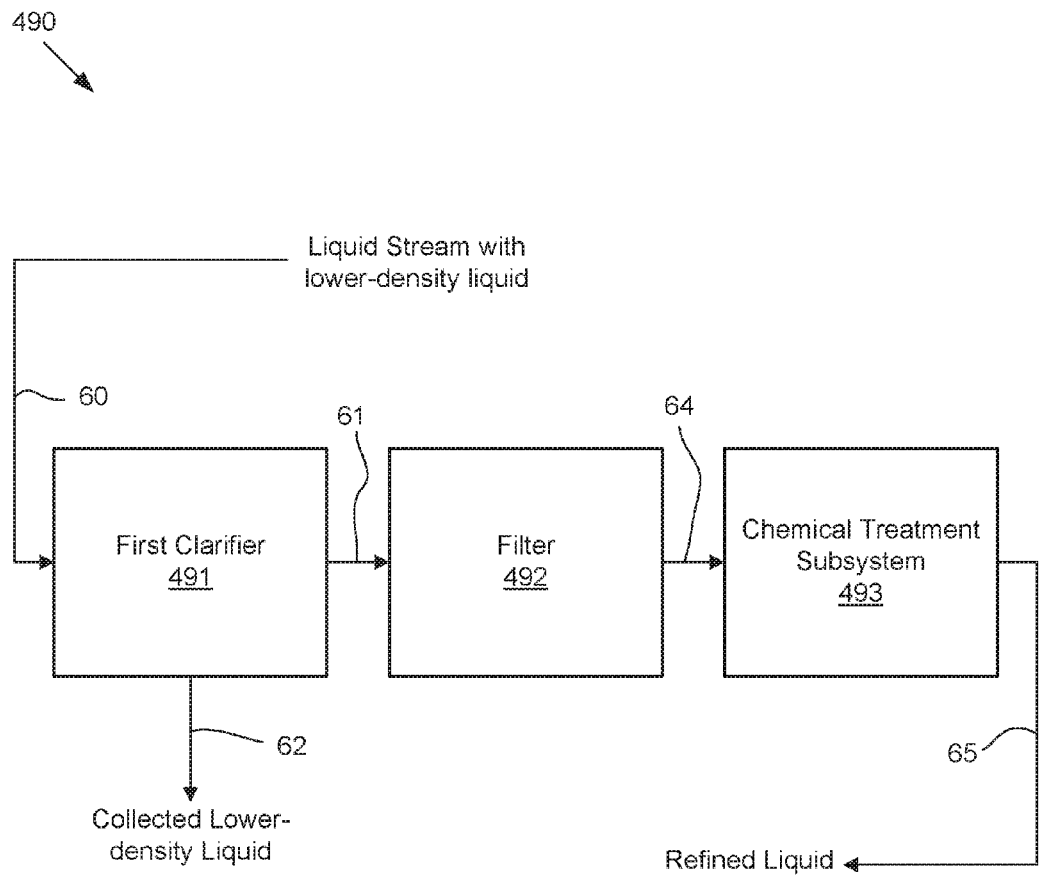
FIG. 12 is a schematic block diagram of a system for removing a lower-density liquid from a liquid stream, according to one embodiment.

FIG. 12 is a schematic block diagram of a system 490 for removing a lower-density liquid from a liquid stream 60, according to one embodiment. The liquid stream includes a liquid carrier having a lower-density liquid mixed therein. The lower-density liquid has a specific gravity that is less than a specific gravity of the liquid carrier. The system 490 includes a first clarifier 491 that separates the lower-density liquid from the liquid carrier 61 by redirecting flow of the liquid carrier 180 degrees from a first direction opposite gravity at a first velocity to a second direction at a second velocity. The first velocity is greater than a rise-velocity of the lower-density liquid in the liquid carrier and the second velocity is less than the rise-velocity. During redirection of the liquid carrier 61 the liquid carrier flows out of inclined channels defined by inclined plates in a third direction substantially perpendicular to the first and second directions. The system 490 also includes a chemical treatment subsystem 493 and a filter 492. In one embodiment, the filter 492 receives the refined liquid carrier 61 from the first clarifier 491 before the chemical treatment subsystem 493. In another embodiment, the chemical treatment subsystem 493 receives the refined liquid carrier 61 from the first clarifier 491 before the filter 492. Regardless the order, the filtered liquid carrier 64 and the chemically treated liquid carrier 65 constitute a refined liquid stream. In one embodiment, the system 490 includes at least one of the following: a pH adjustment subsystem, a de-emulsifier subsystem, a desalination subsystem, and a coalescing subsystem. Further, the system 490 may include backwash media and/or a polishing filter. These components may be able to reduce hydrocarbons down to the parts per billion ranges.

Figure 13:
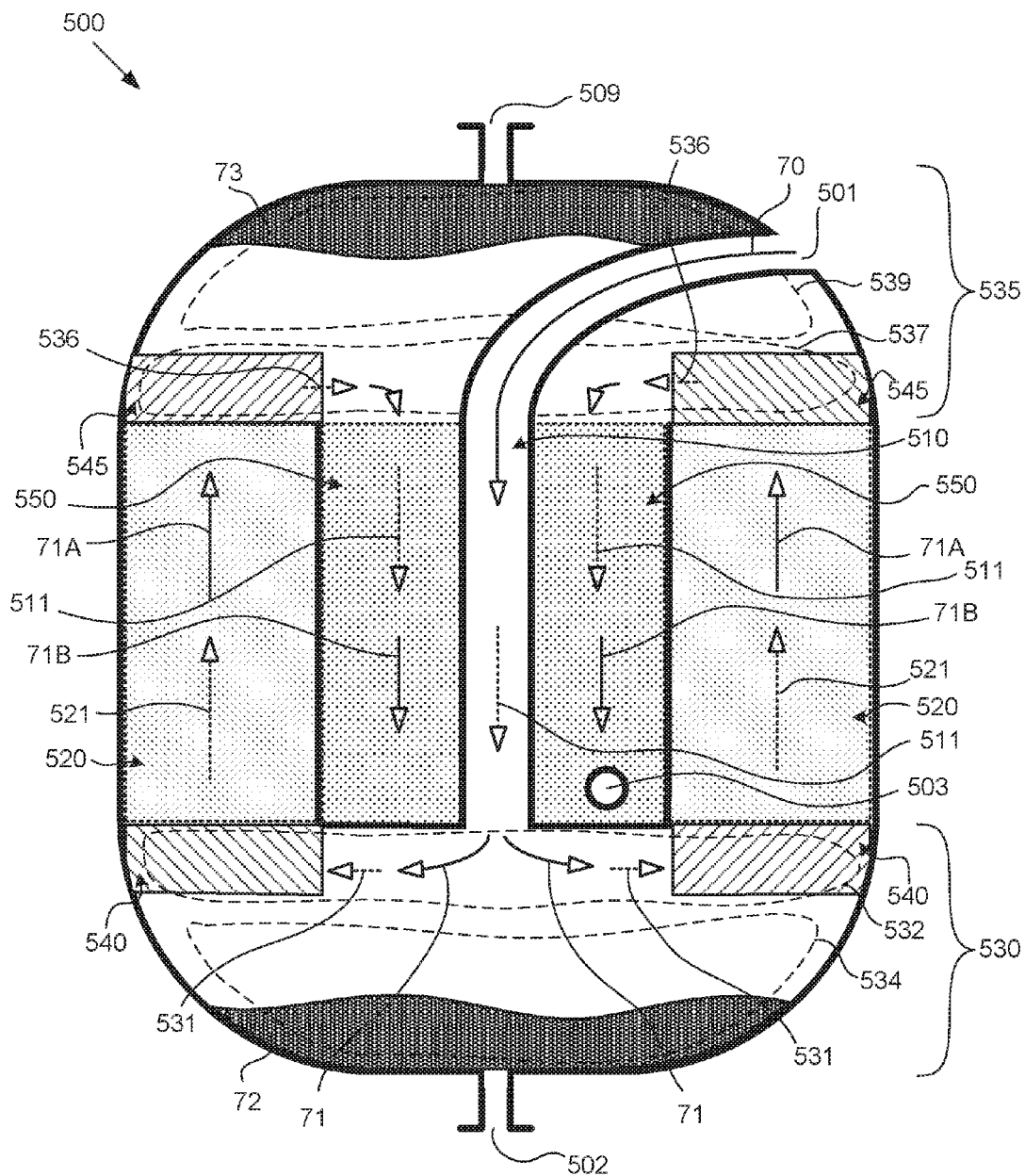
FIG. 13 is a schematic, cross-sectional view of an apparatus for removing both solid particles and a lower-density liquid from a liquid stream, according to one embodiment.
Figure 16:
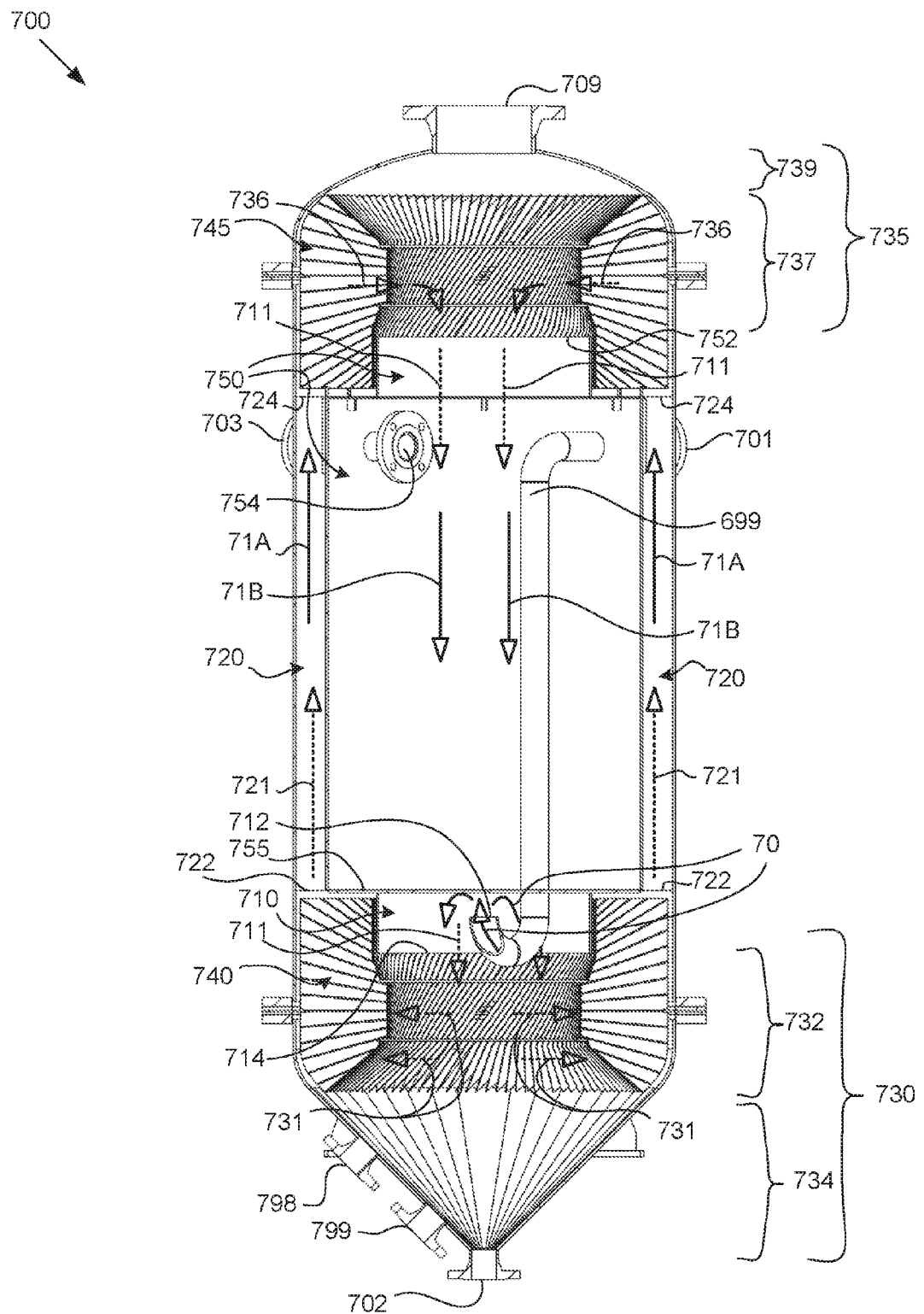
FIG. 16 is a cross-sectional view, as seen from reference plane C shown in FIG. 18, of the apparatus of FIG. 18, according to one embodiment.

FIG. 13 is a schematic, cross-sectional view of an apparatus 500 for removing both solid particles 72 and a lower-density liquid 73 from a liquid stream 70, according to one embodiment. The depicted apparatus 500 combines concepts from the solid-separator apparatus of FIGS. 1-8 with concepts from the liquid-separator of FIGS. 9-12. The depicted apparatus 500 includes three flow chambers 510, 520, 550, two separation chambers 530, 535, and two formations of inclined plates 540, 545. In one embodiment, as depicted in FIG. 13, the inlet pipe is the first flow chamber 510. However, in another embodiment, as depicted in FIG. 16, the inlet pipe 699 is not the first flow chamber 710 but instead the inlet pipe 699 delivers the liquid stream to the first flow chamber 710. In other words, the first flow chamber is defined as the flow compartment just before the 180 degree redirection.

The liquid stream 70 enters the apparatus at a liquid stream inlet 501 and flows into the first flow chamber 510 in a first direction 511 at a first velocity. The first direction 511 is parallel to gravity. The first velocity is greater than a settling velocity of the solid particles 72 in the liquid carrier 71. Upon exiting the first flow chamber 510, the liquid carrier 71 enters a bottom separation chamber 530. The liquid carrier 71 slows to a second velocity and transitions to flow in a second direction 521 opposite gravity. During slowing and redirection, the liquid carrier 71 flows in a third direction 531 perpendicular to the first and second directions 511, 521 into a bottom formation of inclined plates 540. Solid particles 72 in a redirection portion 532 of the separation chamber 530 settle out of the liquid carrier 71 and collect in a collection portion 534 of the separation chamber 530.

After passing through the bottom separation chamber 530 and the bottom formation of inclined plates 540, the liquid carrier 71A, now substantially free of solid particles down to a certain size, flows in the second direction 521 (e.g., upwards) through a second flow chamber 520 at the second velocity. The second velocity is less than the settling velocity of the solid particles 72. In one embodiment, the diameter of the center chamber (e.g., the third flow chamber 550) increases in the second direction 521, thus narrowing, in the second direction 521, the cross-sectional dimension of the second flow chamber 520 to increase the flow velocity in the second flow chamber back to the first velocity.

In one embodiment, the liquid carrier 71A flows out of the second flow chamber 520 at a third velocity and into a top formation of inclined plates 545 and a top separation chamber 535. In an alternative embodiment, the top inclined plates 545 may be omitted if the extra surface area of the top inclined plates 545 is not necessary to achieve a desired degree of separation. Regardless of whether the top inclined plates 545 are included, the liquid carrier 71A experiences a 180 degree redirection and transitions from the third velocity to a fourth velocity. The third velocity is defined herein as the velocity of the liquid carrier 71A flowing out of the second flow chamber 520 and the fourth velocity is defined herein as the velocity of the liquid carrier 71B flowing into the third flow chamber 550. In one embodiment, the second velocity (velocity into the second flow chamber) is the same as the third velocity (velocity out of the second flow chamber).

If the cross-sectional dimension of the second flow chamber 520 changes from the inlet to the outlet, the second velocity would not be the same as the third velocity. For example, if the cross-sectional dimension of the second flow chamber narrows (e.g., via tapering or a step transition), the magnitude third velocity may be substantially the same as the magnitude of the first velocity. That is, the liquid carrier 71A can speed back up to the magnitude of the first velocity so that the liquid enters both 180 redirections at substantially the same speed. Regardless of whether the second flow chamber undergoes a change in cross-sectional dimension, the first velocity (i.e., the velocity of the liquid carrier upon entering the first redirection (e.g., the bottom separation chamber 530) is greater than settling velocity of the solid particles in the liquid carrier. Also, the second velocity (e.g., the velocity of the liquid carrier exiting the first redirection (e.g., the bottom separation chamber 530) is less than the settling velocity of the solid particles in the liquid carrier. The same is true for the third and fourth velocities and the second redirection (e.g., the top separation chamber 535) with reference to the rise velocity of the lower-density liquid in the liquid carrier. That is, the third velocity (e.g., the velocity of the liquid carrier entering the top separation chamber) 535 is greater than the rise velocity while the fourth velocity (e.g., the velocity of liquid carrier exiting the separation chamber 535) is less than the rise velocity. The liquid carrier 71A exits the top formation of inclined plates 545 in a fourth direction 536 substantially perpendicular to the first and second directions 511, 521. In one embodiment, the third and fourth directions 531, 536 are substantially opposite. That is, the third direction 531 is radially outward and the fourth direction 536 is radially inward.

The redirection and slowing of the liquid carrier in the redirection portion 537 of the top separation chamber 535, in conjunction with the flow of the liquid carrier through channels defined by the top formation of inclined plates 545, facilitates the separation of the lower-density liquid 73 from the liquid carrier. The lower-density liquid 73 accumulates in the collection portion 539 of the top separation chamber 535. The liquid carrier 71B, now substantially free of both solid particles 72 and lower-density liquid 73, flows in the first direction 511 (e.g., downwards) in the third flow chamber 550 at the fourth velocity that is less than the third velocity and that is less than the rise-velocity of the lower-density liquid 73 in the liquid carrier. The refined liquid carrier 71B flows out of the apparatus via a refined liquid carrier outlet 503.

In one embodiment, the second flow chamber 520 includes coalescing media to facilitate the separation of the lower-density liquid 73 from the liquid carrier. According to another embodiment, the second flow chamber 520 is annulus formed around the third flow chamber 550. Additional details relating to the apparatus 500 of FIG. 13 can be found above with reference to the similar and analogous embodiments described above. For example, the first and second flow chambers 510, 520, the bottom separation chamber 530, and the bottom inclined plates 540 are analogous to the first and second flow chambers 110, 120, the separation chamber 130, and the inclined plates 140 of FIG. 1, respectively. Also, the second and third flow chambers 520, 550, the top separation chamber 535, and the top inclined plates 545 are analogous to the first and second flow chambers 310, 320, the separation chamber 330, and the inclined plates 340 of FIG. 9, respectively.

Figure 14:
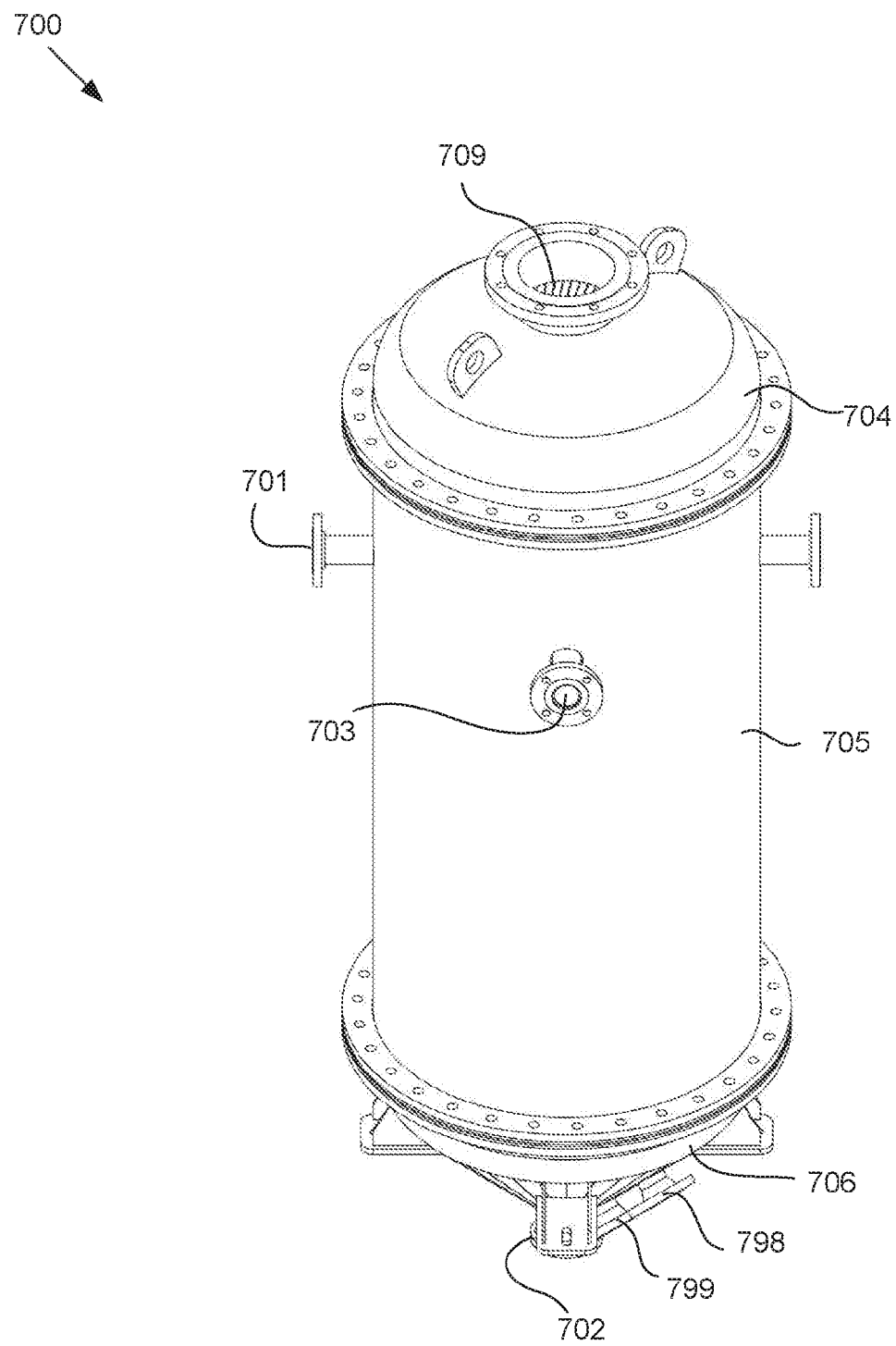
FIG. 14*is* a perspective view of an apparatus for removing both solid particles and a lower-density liquid from a liquid stream, according to one embodiment.
Figure 15:
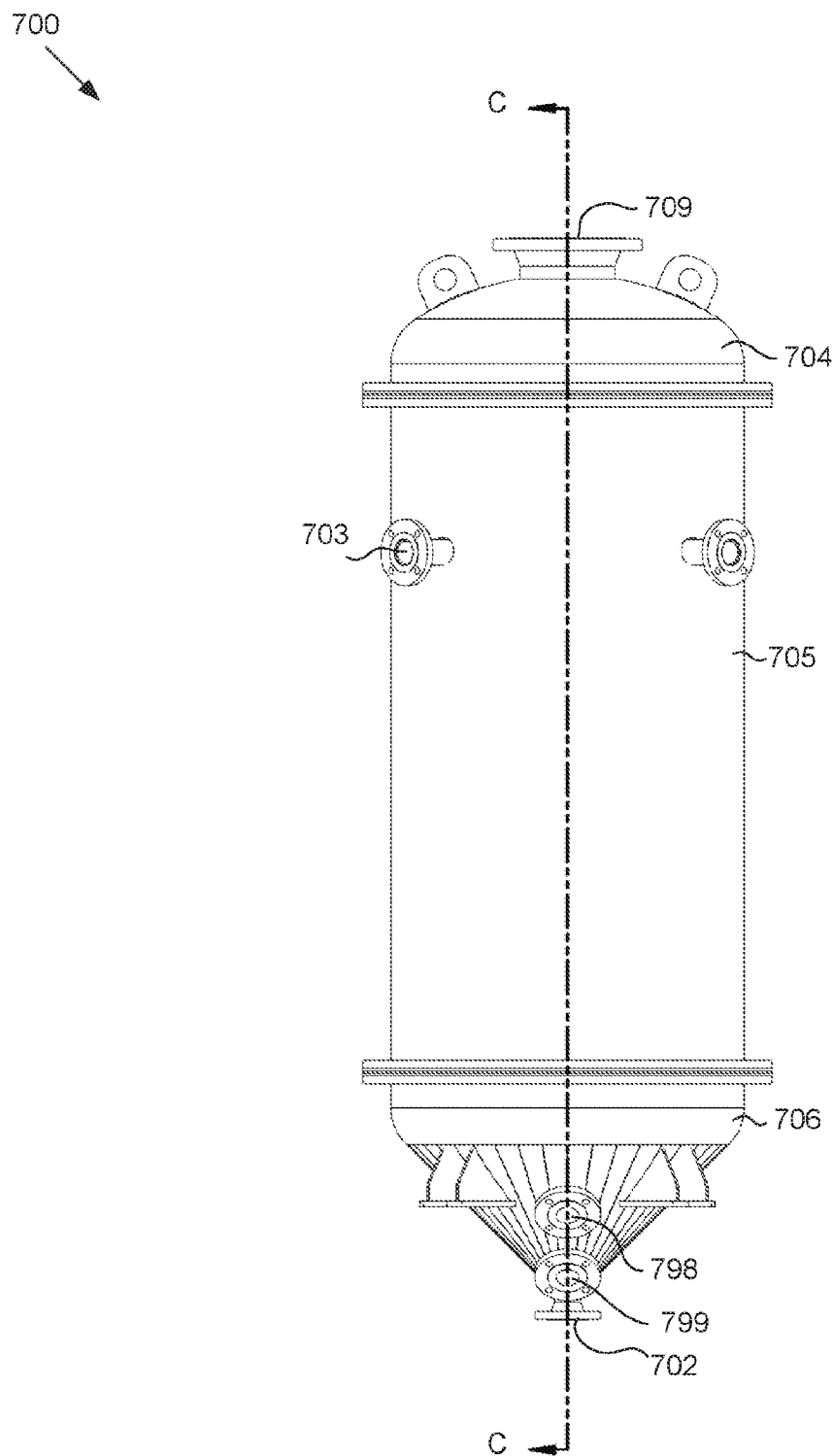
FIG. 15 is a side view of the apparatus of FIG. 17, according to one embodiment.

FIGS. 14-16 illustrate views of one embodiment of the apparatus 700 for removing both solid particles and a lower-density liquid from a liquid stream 70. In the depicted embodiment, two formations of inclined plates are included in the apparatus 700 to maximize the surface area of the inclined plates in order to maximize the separating power of the apparatus. More specifically, FIG. 14 is a perspective view, FIG. 15 is a side view, and FIG. 16 is a cross-sectional view, as seen from reference plane C shown in FIG. 15, of the apparatus 700, according to one embodiment. The depicted apparatus 700 is similar to the apparatus shown and described with reference to FIG. 13. The apparatus 700 includes three flow chambers 710, 720, 750, two separation chambers 730, 735, and two annular formations of inclined plates 740, 745. In an alternative embodiment, the apparatus may only include the bottom formation of inclined plates 740 and the top formation of inclined plates 745 may be omitted. For example, in certain applications the extra surface area of the top inclined plates 745 may not be required to achieve the necessary level of separation. That is, in one embodiment the bottom inclined plates 740, in conjunction with the second 180 degree redirection, may sufficiently separate the lower-density liquid from the liquid carrier.

The liquid stream 70 enters the apparatus at a liquid stream inlet 701 and flows through an inlet pipe 699. A separator plate 755 at the bottom of the third flow chamber 750 separates the third flow chamber 750 from the first flow chamber 710. After passing through the separator plate 755, the inlet pipe 699 outputs the liquid stream either straight down into the first flow chamber 710 (similar to FIG. 12) or the inlet pipe 699 includes a u-bend that turns the liquid stream 70 back in an upwards direction towards the separator plate 755 (as shown in FIG. 16). The outlet of the inlet pipe 699 is the inlet 712 of the first flow chamber 710. Accordingly, the liquid stream exits the inlet pipe 699 in an upwards direction and contacts the underside of the separator plate 755. After hitting the underside of the separator plate 755, the liquid stream flows downward in a first direction 711 parallel to gravity at a first velocity. Thus, while the overall and average direction of the flow of the liquid stream 70 in the first flow chamber 710 is in the first direction 711 (i.e., downward), the local, micro level flow direction of the liquid stream 70 immediately upon exiting the inlet pipe 699 is in an upwards direction, according to one embodiment. This local, micro level upwards flow causes the liquid stream 70 to strike the underside of the separator plate 755, thereby creating an even distribution across the flow chamber 710.

The first velocity is greater than the settling velocity of the solid particles 72 in the liquid carrier 71. Upon exiting the first flow chamber 710, the liquid carrier 71 enters a bottom separation chamber 730. The liquid carrier 71 slows to a second velocity and transitions to flow in a second direction 721 opposite gravity. During slowing and redirection, the liquid carrier 71 flows in a third direction 731 perpendicular to the first and second directions 711, 721 into a bottom formation of inclined plates 740. Solid particles 72 in a redirection portion 732 of the separation chamber 730 settle out of the liquid carrier 71 and collect in a collection portion 734 of the separation chamber 730. As described above with reference to FIGS. 2-4, the apparatus 700 includes multiple ports 702, 799, 798 disposed near the bottom of the apparatus 700. The port at the bottom of the apparatus 700 is the solid outlet 702. The solid particles that collect in the collection portion 734 can be removed from the apparatus 700 via the solid outlet 702 by gravity flow, pressure from an inlet pump, pressure from a pump independent of the inlet pumps, and/or a screw mechanism. The other ports 799, 798 can be used for various types of instruments that can detect the level of the solids accumulating in the collection portion 734. In one embodiment the lower port 799 is used for a tuning fork or similar instrument that measures denser particles. The higher port 798 may be another density detection device that measures lower density solids that settle out slower or may form in a "rag layer" in an upper area of the collection portion 734, just below the inclined plates 740.

After passing through the bottom separation chamber 730 and the bottom formation of inclined plates 740, the liquid carrier 71A, now substantially free of solid particles down to a certain size, flows into the second direction 721 (e.g., upwards) at the second velocity and flows through the second flow chamber 720. In one embodiment, as the liquid carrier flows through the second flow chamber 720, the cross-sectional dimension of the second flow chamber 720 decreases so that the third velocity (e.g., the velocity of the liquid carrier 71A exiting the second flow chamber and flowing into the top separation chamber) is greater than the second velocity. That is, the velocity of the liquid carrier 71A increases by the time the liquid carrier 71A reaches the top of the second flow chamber 720. In one embodiment, the change in the cross-sectional dimension of the second flow chamber 720 may be directly correlated with the diameter of the central chamber (i.e., the third flow chamber 750). In one embodiment, as described above, the third velocity may have the same magnitude as the first velocity. The third velocity is greater than a rise-velocity of the lower-density liquid 73 in the liquid carrier 71A and the fourth velocity is less than the rise-velocity of the lower-density liquid 73 in the liquid carrier 71B.

The liquid carrier 71A flows out of the second flow chamber 720 and undergoes a second 180 degree redirection. As described above, the second 180 direction may include the top formation of inclined plates 745 shown in FIG. 16 or the top formation of inclined plates 745 may be omitted. That is, in certain implementations where the extra surface area of the top inclined plates is not necessary to achieve the liquid-liquid separation, the 180 degree redirection between the second 720 and third flow chambers 750 may sufficiently separate the lower-density liquid from the liquid carrier. It is also possible that the diameter of the center pipe does not transition and stays the same.

In the depicted embodiment, the liquid carrier 71A exits the top formation of inclined plates 745 in a fourth direction 736 substantially perpendicular to the first and second directions 711, 721. In one embodiment, the third and fourth directions 731, 736 are substantially opposite. That is, the third direction 731 is radially outward and the fourth direction 736 is radially inward.

The redirection and slowing of the liquid carrier in the redirection portion 737 of the top separation chamber 735, in conjunction with the flow of the liquid carrier through channels defined by the top formation of inclined plates 745, facilitates the separation of the lower-density liquid 73 from the liquid carrier. The lower-density liquid 73 accumulates in the collection portion 739 of the top separation chamber 735. The liquid carrier 71B, now substantially free of both solid particles 72 and lower-density liquid 73, flows in the first direction 711 (e.g., downwards) in the third flow chamber 750 at the fourth velocity that is less than the third velocity and that is less than the rise-velocity of the lower-density liquid 73 in the liquid carrier. The refined liquid carrier 71B flows out of the apparatus through an outlet 754 of the third flow chamber 750, which is fluidly coupled to the overall apparatus outlet 703. In one embodiment, the outlet 754 of the third flow chamber 750 is positioned near the bottom of the third flow chamber just above the separator plate 755.

In one embodiment, the second flow chamber 720 includes coalescing media to facilitate the separation of the lower-density liquid 73 from the liquid carrier. According to another embodiment, the second flow chamber 720 is annulus formed around the third flow chamber 750. In one embodiment, the third flow chamber 750 includes any type of backwashable media such as sand, black walnut shells or other backwashable media to collect or trap any solids or lower-density liquid that are not separated up to this stage from the liquid carrier. In one embodiment, the apparatus 700 includes a system for backwashing the media through component 703.

Additional details relating to the apparatus 700 of FIG. 13 can be found above with reference to the similar and analogous embodiments described above. For example, the first and second flow chambers 710, 720, the bottom separation chamber 730, and the bottom inclined plates 740 are analogous to the first and second flow chambers 110, 120, the separation chamber 130, and the inclined plates 140 of FIG. 1, respectively. Also, the second and third flow chambers 720, 750, the top separation chamber 735, and the top inclined plates 745 are analogous to the first and second chambers 310, 320, the separation chamber 330, and the inclined plates 340 of FIG. 9, respectively.

As described above, the apparatus 700 may include other features that facilitate or otherwise improve the ease, effectiveness, and/or degree of the separation. For example, in one embodiment the second flow chamber 720 includes coalescing media to improve the separation of the lower-density liquid from the liquid carrier. In another embodiment, back-washable media or other filters may be positioned in the third flow chamber to further refine the liquid carrier.

Figure 17:
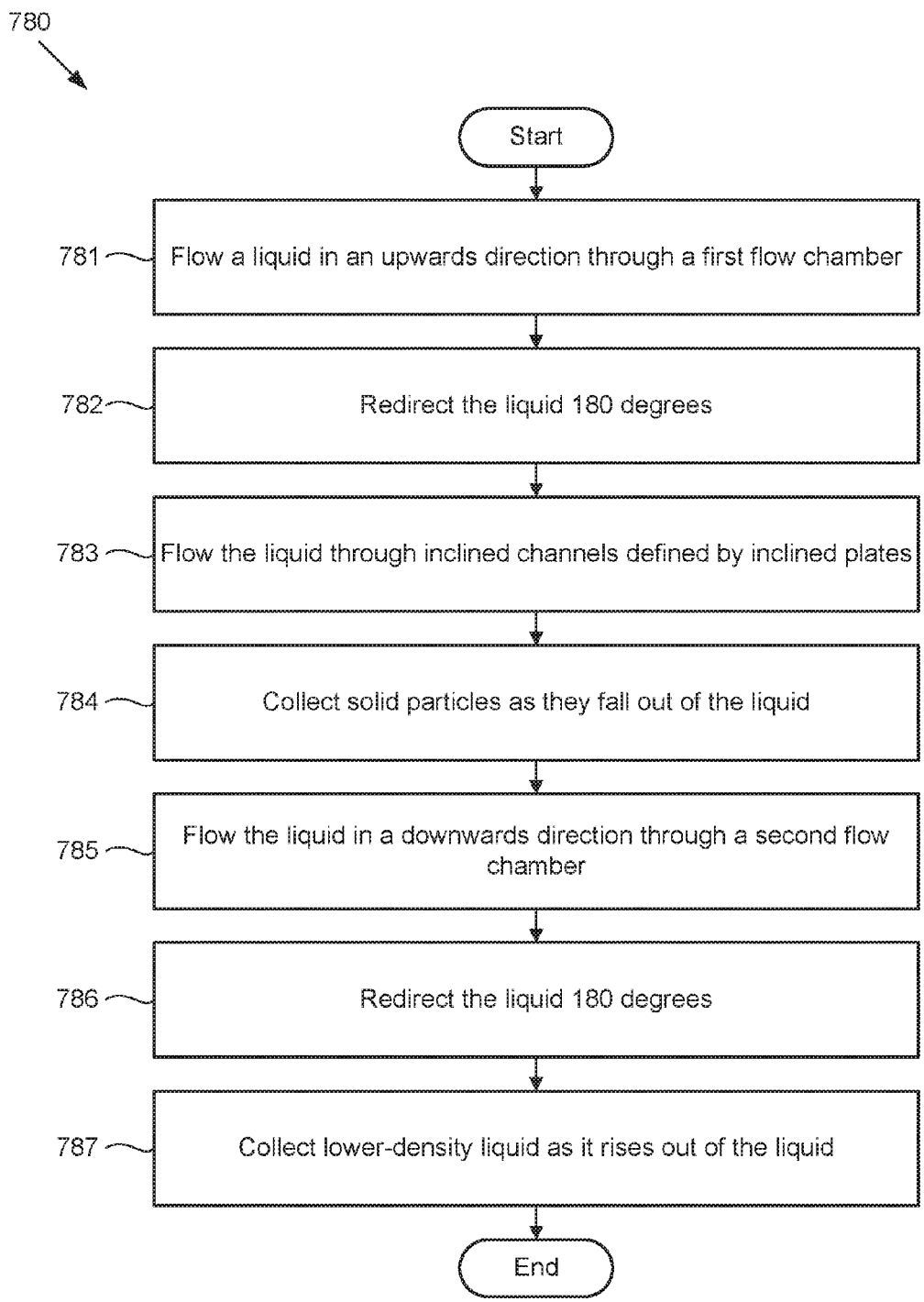
FIG. 17 is a schematic flow chart diagram of a method for removing both solid particles and a lower-density liquid from a liquid stream, according to one embodiment.

FIG. 17 is a schematic flow chart diagram of a method 780 for removing both solid particles and a lower-density liquid from a liquid stream, according to one embodiment. The solid particles have a specific gravity that is greater than the specific gravity of the liquid carrier and the lower-density liquid has a specific gravity that is less than the specific gravity of the liquid carrier. The method 780 includes flowing the liquid stream through a first flow chamber in a first direction at a first velocity at 781. The first direction is substantially parallel to gravity and the first velocity is greater than a settling velocity of the solid particles in the liquid carrier. The method 780 further includes redirecting the liquid carrier 180 degrees such that the liquid carrier flows from the first flow chamber to a second flow chamber in a second direction opposite the first direction at a second velocity less than the settling velocity at 782. The method 780 also includes, during redirecting the liquid carrier, flowing the liquid carrier into inclined channels in a third direction substantially perpendicular to the first and second directions at 783. The inclined channels are defined by inclined plates and fluidly couple an outlet of the first flow chamber and an inlet of the second flow chamber. The method 780 also includes collecting the solid particles as the solid particles fall out of the liquid carrier during redirecting the liquid carrier from the first flow chamber to the second flow chamber at 784 and flowing the liquid stream through the second flow chamber in the second direction at 785. In one embodiment, the second flow velocity is increased in the second flow chamber to a third velocity, which may have the same magnitude as the first velocity. The third velocity is greater than a rise-velocity of the lower-density liquid in the liquid carrier. The method 780 also includes redirecting the liquid carrier 180 degrees such that the liquid carrier flows from the second flow chamber at the third velocity to a third flow chamber in the first direction at the fourth velocity at 786 and collecting the lower-density liquid as the lower-density liquid rises out of the liquid carrier during redirecting the liquid carrier from the second flow chamber to the third flow chamber at 787.

In one embodiment, during redirecting the liquid carrier from the second flow chamber to the third flow chamber, the liquid carrier flows out of top inclined channels in a fourth direction substantially perpendicular to the first and second directions. The top inclined channels are defined by top inclined plates and fluidly couple an outlet of the second flow chamber and an inlet of the third flow chamber.

Figure 18:
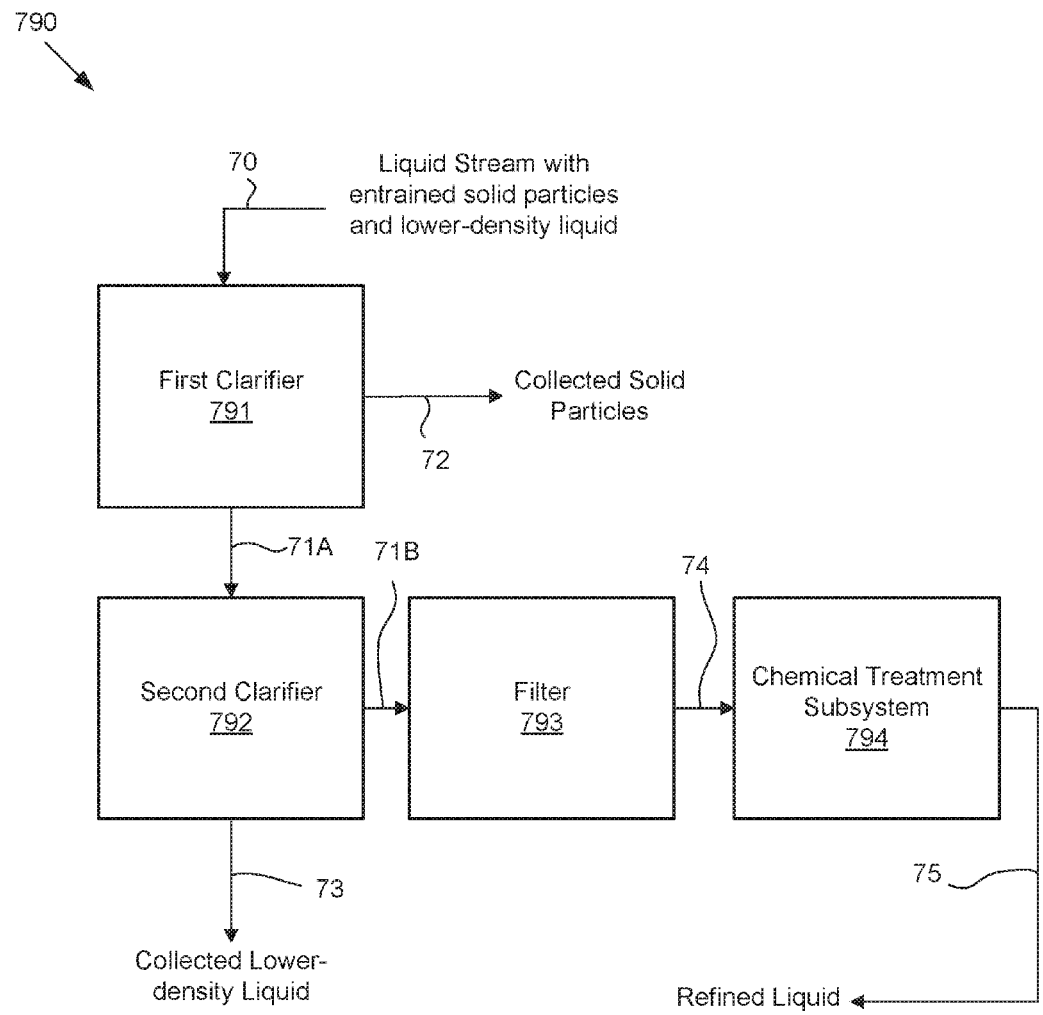
FIG. 18 is a schematic block diagram of a system for removing both solid particles and a lower-density liquid from a liquid stream, according to one embodiment.

FIG. 18 is a schematic block diagram of a system 790 for removing both solid particles and a lower-density liquid from a liquid stream 70, according to one embodiment. The liquid stream 70 includes a liquid carrier having solid particles 72 and a lower-density liquid 73 mixed therein. The solid particles 72 have a specific gravity that is greater than a specific gravity of the liquid carrier and the lower-density liquid 73 has a specific gravity that is less than the specific gravity of the liquid carrier. The system 790 includes a first clarifier 791, a second clarifier 792, a filter 793, and a chemical treatment subsystem 794. The first clarifier 791 separates the solid particles 72 from the liquid carrier by redirecting flow of the liquid carrier 180 degrees from a first direction parallel to gravity at a first velocity to a second direction at a second velocity. The first velocity is greater than a settling velocity of the solid particles in the liquid carrier and the magnitude of the second velocity is less than the settling velocity. During redirection of the liquid carrier the liquid carrier flows into first inclined channels defined by first inclined plates in a third direction substantially perpendicular to the first and second directions. The liquid carrier 71A, now substantially free of solid particles down to a certain size, flows from the first clarifier 791 into the second clarifier 792.

The second clarifier 792 separates the lower-density liquid 73 from the liquid carrier 71A by redirecting flow of the liquid carrier 71A 180 degrees from the second direction at third velocity to the first direction at the fourth velocity. The third velocity is greater than a rise-velocity of the lower-density liquid in the liquid carrier and the fourth velocity is less than the rise-velocity. The chemical treatment subsystem 794 and the filter 793 receive the liquid carrier 71B, now substantially free of solid particles and the lower-density liquid. In one embodiment, during redirection of the liquid carrier in the second clarifier 792 the liquid carrier flows out of second inclined channels defined by second inclined plates in a fourth direction substantially perpendicular to the first and second directions. In such an embodiment, the fourth direction may be opposite the third direction.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C; or some other suitable combination. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for refining a liquid stream, wherein the liquid stream comprises a liquid carrier having a lower-density liquid mixed therein, wherein the lower-density liquid has a specific gravity that is less than a specific gravity of the liquid carrier, the apparatus comprising:
   a first flow chamber for directing the liquid stream upwards in a first direction at a first velocity, wherein the first direction is opposite gravity and the first velocity is greater than a rise-velocity of the lower-density liquid in the liquid carrier;
   a second flow chamber for directing the liquid carrier downwards in a second direction opposite the first direction at a second velocity less than the rise-velocity; and
   a separation chamber disposed between the first flow chamber and the second flow chamber, the separation chamber comprising a redirection portion and a collection portion, wherein:
      the redirection portion of the separation chamber comprises inclined plates across which the liquid carrier flows;
      the redirection portion of the separation chamber redirects flow in the first direction from the first flow chamber to a third direction substantially perpendicular to the first direction and redirects flow in the third direction into the second flow chamber;
      flow of the liquid carrier through the redirection portion of the separation chamber slows from the first velocity to the second velocity; and
      the lower-density liquid rises out of the liquid carrier in the redirection portion and collects in the collection portion of the separation chamber.

2. The apparatus of claim 1, wherein:
   the inclined plates define inclined channels fluidly coupling an outlet of the first flow chamber and an inlet of the second flow chamber; and
   the liquid carrier flows into the inclined channels in the third direction.

3. The apparatus of claim 1, wherein;
   the second flow chamber is an annulus formed around the first flow chamber; and
   the third direction is radially outward.

4. The apparatus of claim 3, wherein:
   the inclined plates in the redirection portion of the separation chamber are circumferentially spaced apart in an annular formation; and
   the annular formation of inclined plates is positioned proximate an inlet of, and substantially concentric with the annulus that is, the second flow chamber.

5. The apparatus of claim 1, wherein a slope of the inclined plates, relative to horizontal, is between about 20 degrees and about 65 degrees.

6. The apparatus of claim 1, wherein a slope of the inclined plates, relative to horizontal, is about 55 degrees.

7. The apparatus of claim 1, wherein a leading edge of each of the inclined plates is bent.

8. The apparatus of claim 1, wherein the cross-sectional area of the second flow chamber is between about 1.5 and about 3 times the cross-sectional area of the first flow chamber.

9. The apparatus of claim 1, wherein the first flow chamber, the second flow chamber, and the separation chamber are free of moving parts.

10. The apparatus of claim 1, wherein the first flow chamber comprises a coalescing media.

11. The apparatus of claim 1, wherein the liquid carrier also has solid particles mixed therein, wherein the solid particles have a specific gravity that is greater than the specific gravity of the liquid carrier, the apparatus further comprising:
   a third flow chamber for directing the liquid carrier downwards in the second direction; and
   a bottom separation chamber disposed between the third flow chamber and the first flow chamber, the bottom separation chamber comprising a bottom redirection portion and a bottom collection portion, wherein:
      the bottom redirection portion of the bottom separation chamber redirects flow in the second direction from the third flow chamber at a third velocity to the first direction in the first flow chamber at a fourth velocity;
      the third velocity is greater than the settling velocity of the solid particles in the liquid carrier and the fourth velocity is less than the settling velocity; and
      the solid particles fall out of the liquid carrier in the bottom redirection portion of the bottom separation chamber and collect in the bottom collection portion of the bottom separation chamber.

12. The apparatus of claim 11, wherein:
   the bottom redirection portion of the bottom separation chamber comprises bottom inclined plates across which the liquid carrier flows;
   the bottom redirection portion of the bottom separation chamber redirects flow in the second direction from the third flow chamber to a fourth direction substantially perpendicular to the first and second directions and redirects flow in the fourth direction into the first flow chamber; and
   flow of the liquid carrier through the bottom redirection portion of the bottom separation chamber slows from the third velocity to the fourth velocity.

13. The apparatus of claim 12, wherein:
   the bottom inclined plates define bottom inclined channels fluidly coupling an outlet of the third flow chamber and an inlet of the first flow chamber; and
   the liquid carrier flows into the bottom inclined channels in the fourth direction.

14. The apparatus of claim 12, wherein the fourth direction is substantially is opposite the third direction.

15. The apparatus of claim 11, wherein the first flow chamber is an annulus formed around the second flow chamber.

16. The apparatus of claim 15, wherein:
   the bottom inclined plates in the bottom redirection portion of the bottom separation chamber are circumferentially spaced apart in an annular formation; and the annular formation of the bottom inclined plates is positioned proximate an inlet of, and substantially concentric with the annulus that is, the first flow chamber.

17. A method for refining a liquid stream, wherein the liquid stream comprises a liquid carrier having a lower-density liquid mixed therein, wherein the lower-density liquid has a specific gravity that is less than a specific gravity of the liquid carrier, the method comprising:

flowing the liquid stream through a first flow chamber in a first direction at a first velocity, wherein the first direction is substantially opposite gravity and the first velocity is greater than a rise-velocity of the lower-density liquid in the liquid carrier;

redirecting the liquid carrier 180 degrees such that the liquid carrier flows into a second flow chamber in a second direction opposite the first direction at a second velocity less than the rise-velocity; wherein:

during redirecting the liquid carrier, the liquid carrier flows out of inclined channels in a third direction substantially perpendicular to the first and second directions; and the inclined channels are defined by inclined plates and fluidly couple an outlet of the first flow chamber and an inlet of the second flow chamber; and collecting the lower-density liquid as the lower-density liquid rises out of the liquid carrier during redirecting the liquid carrier.

18. The method of claim 17, further comprising electrostatically charging the inclined plates.

19. The method of claim 17, wherein the first velocity is about twice the second velocity.

20. An apparatus for refining a liquid stream, wherein the liquid stream comprises a liquid carrier having a lower-density liquid mixed therein, wherein the lower-density liquid has a specific gravity that is less than a specific gravity of the liquid carrier, the apparatus comprising:

a first flow chamber for directing the liquid stream upwards in a first direction at a first velocity, wherein the first direction is opposite gravity and the first velocity is greater than a rise-velocity of the lower-density liquid in the liquid carrier;

a second flow chamber for directing the liquid carrier downwards in a second direction opposite the first direction at a second velocity less than the rise-velocity, wherein the second flow chamber is an annulus formed around the first flow chamber; and a separation chamber disposed between the first flow chamber and the second flow chamber, the separation chamber comprising a redirection portion and a collection portion, wherein:

the redirection portion of the separation chamber comprises inclined plates across which the liquid carrier flows;

the inclined plates define inclined channels fluidly coupling an outlet of the first flow chamber and an inlet of the second flow chamber;

the inclined plates are circumferentially spaced apart in an annular formation;

the annular formation of inclined plates is positioned proximate an inlet of, and substantially concentric with the annulus that is, the second flow chamber;

the redirection portion of the separation chamber redirects flow in the first direction from the first flow chamber to a radially outward direction substantially perpendicular to the first direction and redirects flow in the radially outward direction into the second flow chamber;

the liquid carrier flows into the inclined channels in the radially outward direction;

flow of the liquid carrier through the redirection portion of the separation chamber slows from the first velocity to the second velocity; and the lower-density liquid rises out of the liquid carrier in the redirection portion and collects in the collection portion of the separation chamber.

\* \* \* \* \*